United States Patent
Jacobs et al.

(10) Patent No.: US 7,603,285 B2
(45) Date of Patent: Oct. 13, 2009

(54) ENTERPRISE SCHEDULING SYSTEM FOR SCHEDULING MOBILE SERVICE REPRESENTATIVES

(75) Inventors: Simon Jacobs, Vancouver (CA); Derek Krezeski, Vancouver (CA); Guy Druce, Richmond (CA)

(73) Assignee: Ventyx Software SRL, St. Michael (BB)

( * ) Notice: Subject to any disclaimer, the term of this patent is extended or adjusted under 35 U.S.C. 154(b) by 400 days.

(21) Appl. No.: 09/824,852

(22) Filed: Apr. 2, 2001

(65) Prior Publication Data

US 2001/0037229 A1    Nov. 1, 2001

Related U.S. Application Data

(60) Provisional application No. 60/193,834, filed on Mar. 31, 2000, provisional application No. 60/193,917, filed on Mar. 31, 2000, provisional application No. 60/193,832, filed on Mar. 31, 2000, provisional application No. 60/193,705, filed on Mar. 31, 2000, provisional application No. 60/193,833, filed on Mar. 31, 2000.

(51) Int. Cl.
*G06F 17/60* (2006.01)
(52) U.S. Cl. ..................... 705/9; 705/7; 705/8
(58) Field of Classification Search ........... 705/8, 705/9
See application file for complete search history.

(56) References Cited

U.S. PATENT DOCUMENTS

| | | | |
|---|---|---|---|
| 4,937,743 A | 6/1990 | Rassman et al. | 364/401 |
| 5,093,794 A | 3/1992 | Howie et al. | 364/468 |
| 5,113,380 A | 5/1992 | Levine | 368/10 |
| 5,168,451 A | 12/1992 | Bolger | 364/436 |
| 5,289,368 A * | 2/1994 | Jordan et al. | 705/8 |
| 5,289,531 A | 2/1994 | Levine | 379/93 |
| 5,325,292 A * | 6/1994 | Crockett | 705/9 |
| 5,355,511 A | 10/1994 | Hatano et al. | 455/11.1 |
| 5,428,546 A | 6/1995 | Shah et al. | 364/449 |
| 5,467,268 A * | 11/1995 | Sisley et al. | 705/9 |
| 5,524,077 A | 6/1996 | Faaland et al. | 364/402 |
| 5,532,702 A | 7/1996 | Mintz | 342/463 |
| 5,590,269 A | 12/1996 | Kruse et al. | 395/209 |
| 5,615,121 A | 3/1997 | Babayev et al. | 395/209 |

(Continued)

FOREIGN PATENT DOCUMENTS

DE    195 39 662 C2    10/1997

(Continued)

OTHER PUBLICATIONS

MDSI Mobile Data Solutions, www.mdsi-advantex.com, Dec. 2, 1998 [retrieved Apr. 11, 2005], pp. 1-31, retrieved from: Google.com and archive.org.*

(Continued)

*Primary Examiner*—Albert DeCady
*Assistant Examiner*—Dave Robertson
(74) *Attorney, Agent, or Firm*—Dorsey & Witney LLP

(57) ABSTRACT

Systems and methods for providing an enhanced scheduling process are discussed. One embodiment of the present invention includes a method for scheduling mobile service representatives. The method includes negotiating an appointment window for booking a reservation, assigning the reservation to a shift of a mobile service representative, and optimizing periodically the shift of the mobile service representative while the acts of negotiating and assigning are executing.

43 Claims, 11 Drawing Sheets

U.S. PATENT DOCUMENTS

| | | | | |
|---|---|---|---|---|
| 5,623,404 | A | * | 4/1997 | Collins et al. .................... 705/9 |
| 5,636,122 | A | | 6/1997 | Shah et al. ................ 364/449.1 |
| 5,655,118 | A | | 8/1997 | Heindel et al. .............. 395/614 |
| 5,737,728 | A | * | 4/1998 | Sisley et al. ..................... 705/8 |
| 5,758,313 | A | | 5/1998 | Shah et al. ................... 701/208 |
| 5,764,953 | A | | 6/1998 | Collins et al. .............. 395/200 |
| 5,774,661 | A | | 6/1998 | Chatterjee et al. ...... 395/200.33 |
| 5,774,867 | A | | 6/1998 | Fitzpatrick et al. ............. 705/8 |
| 5,826,239 | A | | 10/1998 | Du et al. ......................... 705/8 |
| 5,848,395 | A | * | 12/1998 | Edgar et al. ..................... 705/9 |
| 5,860,067 | A | | 1/1999 | Onda et al. ..................... 705/9 |
| 5,870,545 | A | | 2/1999 | Davis et al. ............ 395/200.31 |
| 5,893,906 | A | | 4/1999 | Daffin et al. .................. 705/28 |
| 5,904,727 | A | | 5/1999 | Prabhakaran ............... 701/208 |
| 5,913,201 | A | * | 6/1999 | Kocur ............................ 705/9 |
| 5,920,846 | A | * | 7/1999 | Storch et al. ................... 705/7 |
| 5,922,040 | A | | 7/1999 | Prabhakaran ............... 701/117 |
| 5,963,913 | A | | 10/1999 | Henneuse et al. .............. 705/9 |
| 5,970,466 | A | | 10/1999 | Detjen et al. ................... 705/8 |
| 6,016,477 | A | | 1/2000 | Ehnebuske et al. ............. 705/7 |
| 6,047,260 | A | | 4/2000 | Levinson ........................ 705/9 |
| 6,070,144 | A | * | 5/2000 | Ginsberg et al. ............... 705/9 |
| 6,088,626 | A | | 7/2000 | Lilly et al. ................... 700/100 |
| 6,092,048 | A | | 7/2000 | Nakaoka ......................... 705/9 |
| 6,115,640 | A | | 9/2000 | Tarumi ......................... 700/99 |
| 6,144,971 | A | | 11/2000 | Sunderman et al. ......... 707/500 |
| 6,219,412 | B1 | | 4/2001 | Wellner et al. .............. 379/202 |
| 6,278,978 | B1 | | 8/2001 | Andre et al. .................... 705/9 |
| 6,415,259 | B1 | | 7/2002 | Wolfinger et al. .............. 705/8 |
| 6,430,562 | B1 | | 8/2002 | Kardos et al. ................. 707/10 |
| 6,473,748 | B1 | | 10/2002 | Archer ........................ 706/45 |
| 6,484,036 | B1 | | 11/2002 | Sorkin et al. ................ 455/508 |
| 6,532,465 | B2 | | 3/2003 | Hartley et al. ................. 707/10 |
| 6,535,883 | B1 | | 3/2003 | Lee et al. ..................... 707/100 |
| 6,546,364 | B1 | | 4/2003 | Smirnov et al. .............. 703/22 |
| 6,546,425 | B1 | | 4/2003 | Hanson et al. .............. 709/227 |
| 6,578,005 | B1 | * | 6/2003 | Lesaint et al. ................... 705/8 |
| 6,633,900 | B1 | | 10/2003 | Khalessi et al. ............. 709/202 |
| 6,697,784 | B2 | | 2/2004 | Bacon et al. .................... 705/9 |
| 6,701,299 | B2 | | 3/2004 | Kraisser et al. ................. 705/8 |
| 6,721,288 | B1 | | 4/2004 | King et al. .................. 370/310 |
| 6,745,381 | B1 | | 6/2004 | Ehnebuske et al. .......... 717/100 |
| 6,754,321 | B1 | | 6/2004 | Innes et al. ............ 379/201.03 |
| 6,823,315 | B1 | * | 11/2004 | Bucci et al. ..................... 705/9 |
| 6,850,895 | B2 | | 2/2005 | Brodersen et al. .............. 705/9 |
| 7,127,412 | B2 | | 10/2006 | Powell et al. ................... 705/9 |
| 2001/0029499 | A1 | | 10/2001 | Tuatini et al. ................. 706/47 |
| 2001/0047287 | A1 | | 11/2001 | Jacobs et al. .................... 705/9 |
| 2001/0047288 | A1 | | 11/2001 | Jacobs et al. .................... 705/9 |
| 2001/0049619 | A1 | | 12/2001 | Powell et al. ................... 705/9 |
| 2002/0007299 | A1 | | 1/2002 | Florence ......................... 705/9 |
| 2002/0010610 | A1 | | 1/2002 | Jacobs et al. .................... 705/8 |
| 2002/0010615 | A1 | | 1/2002 | Jacobs ............................ 705/9 |
| 2002/0016645 | A1 | | 2/2002 | Jacobs et al. ................ 700/100 |
| 2002/0023157 | A1 | | 2/2002 | Lo et al. ...................... 709/227 |
| 2002/0035493 | A1 | | 3/2002 | Mozayeny et al. .............. 705/5 |
| 2002/0046073 | A1 | | 4/2002 | Indseth et al. ................... 705/8 |
| 2002/0065700 | A1 | | 5/2002 | Powell et al. ................... 705/9 |
| 2002/0199182 | A1 | | 12/2002 | Whitehead ..................... 725/1 |
| 2005/0027580 | A1 | | 2/2005 | Crici et al. ...................... 705/8 |

FOREIGN PATENT DOCUMENTS

| | | |
|---|---|---|
| WO | WO 00/28451 A3 | 5/2000 |
| WO | WO 00/68856 | 11/2000 |
| WO | WO 00/68859 | 11/2000 |

OTHER PUBLICATIONS

Adhikari, R., "Scheduling Solutions", Information Week, www.informationweek.com, Apr. 1998. 7 pages.

Alanko T. et al., "Mowgli: Improvements for Internet Applications Using Slow Wireless Links", The 8$^{th}$ IEEE International Symposium on Personal, Indoor and Mobile Radio Communications, vol. 3, 1997, pp. 1038-1042.

ClickSchedule, Products, Click Schedule Tour and Article Web pages, ClickService Software, Inc., www.clickservice.com/products, 2000 (retrieved Feb. 2005). 12 pages.

Gunes, E.D., "Workforce Scheduling", Department of Industrial Engineering Bilkent University, Apr. 1999, 1-11.

ILOG.com, "ILOG Dispatcher Field Service Dispatcher", ILOG Worldwide (retrieved from archive.org), Dec. 2000 (retrieved Feb. 2005).

ILOG.com, ILOG World Leader in software components, Business Rules, Rule Engine, Rule Language, Rule Kit, Constraint Base Scheduling, ILOG Dispatcher Web pages, www.ilog.com/products/rules, 2000 (retrieved Feb. 2005). 21 pages.

Keller, A. et al., "Zippering: Managing intermittent connectivity in DIANA", Mobile Networks and Application, Baltzer Science Publishers BV, Netherlands, vol. 2, No. 4, 1997. pp. 357-364.

Kleinrock, L., "Nomadicity: Anytime, anywhere in a disconnected world", Mobile Networks and Applications, Journal of Special Topics in Mobile Networks and Applications, J.C. Baltzer AG, Science Publishers, Netherlands, vol. 1, No. 4, pp. 351-357.

LaPorta T.F. et al., "Challenges for nomadic computing: Mobility management and wireless communications", Mobile Networks and Applications, Journal of Special Topics in Mobile Networks and Applications, J.C. Baltzer AG, Science Publishers, Netherlands, vol. 1, No. 1, Aug. 1996, pp. 3-16.

Livneh, E., "Case Study: Automating Service Allocation and Scheduling", Association for Services Management International, www.afsmi.org, May 1997. pp. 1-5.

Marshak, R.T, "ClickSchedule: Completing the Online Buying Experience", ClickSoftware Patrica Seybold Group, Oct. 1999. pp. 1-3.

Mazer, M.S. et al., "Writing the Web While Disconnected", IEEE Personal Communications, vol. 5, No. 5, Oct. 1998. pp. 35-41.

Mummert L. et al., "Exploiting Weak Connectivity for Mobile File Access", Fifteenth AC Symposium on Operating Systems Principles, Colorado, vol. 29, No. 5, Dec. 1995. pp. 143-155.

Open Wave—Home and Shift Track Web pages, www.open-wave.com (retrieved from archive.org), Open Wave, Inc., 1999. 5 pages.

Padwick, G. et al., Special Edition Using Microsoft© Outlook© 2000, Que, ISBN 0-7897-1909-6, May 1999. 47 pages.

"DeliveryNet for Home Delivery", www.Descartes.com, e-Fulfillment Solutions, Mar. 20, 2000. Nine pages.

DiCarlo, L., "Connectria: E-scheduling is next big thing", eWeek, Mar. 20, 2000. pp. 1-3.

Domenjoud, E. et al., "Generating feasible schedules for a pick-up and delivery problem", Proceedings of CP, Technical Report 98-R-142, Apr. 1998. pp. 1-12.

Dumas, Y. et al., "Pickup and Delivery Problem with Time Windows", European Journal of Operational Research, vol. 54. No. 1, Sep. 1991. Abstract only. One page.

Mitrovic-Minic, S., "Pickup and Delivery Problem with Time Windows: A Survey", SFU CMPT TR 1998-12, ftp://fas.sfu.ca/pub/cs/techreports/1998, May 1998. pp. 1-43.

Nanry, W.P. et al., "Solving the pickup and delivery problem with time windows using reactive tabu search", Transportation Research, Part B, Apr. 1999. pp. 107-121.

Sciacca, P., "Webvan Gets E-Business Software for Expansion", Supermarket News, Jan. 2000. Two pages.

Solomon, M.M., "Algorithms for the Vehicle Routing and Scheduling Problems with Time Window Constraints", Operations Research, vol. 35, No. 2, Mar.-Apr. 1987. pp. 254-265.

"Vantive and MDSI to Provide Enterprise-Wide Wireless Field Service Solution", PR Newswire, New York, Oct. 26, 1998. pp. 1-3.

Witt, C.E., "Update: Material Handling in the Food Industry", Material Handling Engineering, vol. 54, No. 11, Oct. 1999. Eleven pages.

Blumberg, D., "Optimizing Mobile Workforce", Leisure Publications, Feb. 1, 2001.

"Scheduling Software Helps Webvan Meet 30-Minute Delivery Window", Stores Magazine NRF Enterprises, Inc., Jul. 2000. 2 pages.

Bisio, R. et al., "Effective Resource Scheduling in Work Force Management Context for Telecommunication Work Centers", Torino, Italy, CPAIOR, 1999. Five pages.

Collins, J.E. et al., "Autotmated Assignment and Scheduling of Service Personnel", IEEE Expert, Apr. 1994. pp. 33-39.

Guido, B. et al, "Work Force Management (WFM) Issues", Network Operations and Management Systems, IEEE 1998. pp. 473-482.

Jing, J. et al., "WHAM: Supporting Mobile Workforce and Applications in Workflow Environments", Research Issues in Data Engineering, RIDE 2000, Feb. 2000. Eight pages.

Lesaint, D. et al., "Dynamic Workforce Management", The Institution of Electrical Engineers, IEE Colloquium on Al for Network Management Systems, 1997. pp. 1-5.

Lesaint, D. et al., "Dynamic Workforce Scheduling for British Telecommunications plc", Interfaces, vol. 30, No. 1, Jan.-Feb. 2000. pp. 45-52.

Balakrishnan, N., "Simple Heuristics for the Vehicle Routeing Problem with Soft Time Windows", The Journal of the Operational Research Society, vol. 44, No. 3, Mar. 1993. pp. 279-287

Ferland, J. et al., "Vehicles scheduling with sliding time windows", www.sciencedirect.com, European Journal of Operational Research, vol. 38, Issue 2, Jan. 1989. Two pages.

Johns, S., "Heuristics to Schedule Service Engineers Within Time Windows", Journal of the Operational Research Society, Vol. 46, No. 3, 1995. pp. 339-346.

Larsen, A., "The Dynamic Vehicle Routing Problem", Lyngby 2000. pp. i-192.

Liu, F. et al., "A route-neighborhood-based metaheuristic for vehicle routing problem with time windows", European journal of Research, vol. 118, 1999. pp. 485-504.

Smith, S., "Reactive Scheduling Systems", Center for Integrated Manufacturing Decision Systems, The Robotics Institute, Carnegie Mellon University, Intelligent Systems, 1994. pp. 1-38.

"*PrimeTime F & S User's Guide*", Version 1.3, Blue Pumpkin Software, Inc, 1998.

"*User's Guide to Roadnet 5000, Routing and Scheduling System*" Version 5.6, Roadnet Technologies, Inc., 1996.

"*Visual Staff Scheduler PRO User Guide*", Version 3.0, Atlas Business Solutions, Inc., 1997.

Aytug, H. et al., "A Review of Machine Learning in Scheduling", IEEE Transactions on Engineering Management, vol. 41, No. 2, May 1994. pp. 165-171.

"Connectria Unveils ServeClick to Enable the Next Wave of E-Commerce—'E-Scheduling' of Services, Appointments & Reservations", Business Wire, New York, Jan. 4, 2000. Two pages.

De Serres, Y., "Simultaneous optimization of flow control and scheduling in queues", McGill University, Publication No. AAT NN72160, 1991. Abstract only, one page.

Marinho J. et al., "Decision Support System for Dynamic Production Scheduling", IEEE International Symposium on Assembly and Task Planning, Jul. 1999. pp. 424-429.

Martin, J., "Principles of Object-Oriented Analysis and Design", PTR Prentice Hall, New Jersey, 1993. pp. vii-xiii and 133-154.

McFeely, D.J. et al., "Scheduling to Achieve Multiple Criteria in an Air Force Depot CNC Machine Shop", Production and Inventory Management Journal, vol. 38, No. 1, First Quarter 1997. 72-79.

"MenuHunter.com to Provide the Ultimate in Online Restaurant Reservations Using ServeClick from Connectria; Service to Handle Complex, Real-World Needs of Restaurants & Patrons", Business Wire, New York, Feb. 1, 2000. Three pages.

Panwalker, S.S. et al., "A Survey of Scheduling Rules", Operations Research, vol. 25, No. 1, Jan.-Feb. 1977. pp. 45-61.

Pierreval, H. et al., "Dynamic Selection of Dispatching Rules for Manufacturing System Scheduling", International Journal Production Research, vol. 35, No. 6, 1997. pp. 1575-1591.

"RestaurantRow.com Selects ServeClick from Connectria to Power its Advanced Online Restaurant E-Scheduling", PR Newswire, New York, Feb. 1, 2000. Three pages.

"Serveclick", U.S. Trademark Application 75914207, Applicant: Catalyst Solutions Group, Inc., filed Feb. 9, 2000, abandoned Feb. 17, 2001. One page.

"ServeClick.com" Web pages retrieved from archive.org on Apr. 2006, ServeClick, 1999-2000. pp. 1-13.

Tkach, D. et al., "Visual Modeling Technique Object Technology Using Visual Programming", Addison-Wesley, 1996. pp. 324-336.

* cited by examiner

300

302

| RESERVATION | |
|---|---|
| IDENTIFIER | RESERVATION1 |
| APPOINTMENT WINDOW START AND END DATETIME | 09:00 TO 11:00 TODAY |
| DURATION | 120 MINUTES |
| LOCATION | $(X_1, Y_1)$ |
| CONFIGURABLE FIELDS: | |
|     AREA | A1 |
|     SKILLS | SK1, SK2 |
|     EQUIPMENT | EQ1, EQ2, EQ3 |

304

| MOBILE SERVICE REPRESENTATIVE | |
|---|---|
| MOBILE USER IDENTIFIER | MU1 |
| CONFIGURABLE FIELDS: | |
|     SKILLS | SK1, SK4, SK7 |
|     EQUIPMENT | EQ1, EQ2, EQ3, EQ4 |

306

| SHIFT | |
|---|---|
| IDENTIFIER | SHIFT1 |
| MOBILE USER IDENTIFIER | MU1 |
| START AND END DATETIME | 08:00 TO 17:00 TODAY |
| BREAKS | 10:00 TO 10:15<br>12:00 TO 13:00<br>15:00 TO 15:15 |
| START AND END LOCATION | $(X_S, Y_S)$ AND $(X_E, Y_E)$ |
| CONFIGURABLE FIELDS: | |
|     AREAS | A1, A2 |

*Fig. 3A*

| RESERVATION | |
|---|---|
| IDENTIFIER | RESERVATION2 |
| APPOINTMENT WINDOW START AND END DATETIME | 14:00 TO 16:00 TODAY |
| DURATION | 60 MINUTES |
| LOCATION | $(X_2, Y_2)$ |
| CONFIGURABLE FIELDS: | |
| AREA | A2 |
| SKILLS | SK7 |
| EQUIPMENT | NONE |

| RESERVATION | |
|---|---|
| IDENTIFIER | RESERVATION3 |
| DURATION | 50 MINUTES |
| LOCATION | $(X_3, Y_3)$ |
| CONFIGURABLE FIELDS: | |
|     AREA | A1 |
|     SKILLS | SK4 |
|     EQUIPMENT | NONE |

Fig. 3F

| START TIME | END TIME | REASON OFFERED |
|---|---|---|
| 08:00 | 09:00 | OVERLAPS THE 08:20 TO 09:35 START TIME RANGE |
| 09:00 | 10:00 | OVERLAPS THE 08:20 TO 09:35 START TIME RANGE |
| 10:00 | 11:00 | NOT OFFERRED |
| 11:00 | 12:00 | OVERLAPS THE 11:35 TO 14:05 START TIME RANGE |
| 13:00 | 14:00 | OVERLAPS THE 11:35 TO 14:05 START TIME RANGE |
| 14:00 | 15:00 | OVERLAPS THE 11:35 TO 14:05 START TIME RANGE |
| 15:00 | 16:00 | OVERLAPS THE 15:35 TO 15:50 START TIME RANGE |
| 16:00 | 17:00 | NOT OFFERRED |
| 08:00 | 12:00 | OVERLAPS THE FIRST TWO START TIME RANGES |
| 13:00 | 17:00 | OVERLAPS THE LAST TWO START TIME RANGES |
| 08:00 | 17:00 | OVERLAPS ALL THREE START TIME RANGES |

Fig. 3G

| IDENTIFIER | START TIME | END TIME | IDENTIFIER | START TIME | END TIME |
|---|---|---|---|---|---|
| 8 | 08:00 | 10:00 | 14 | 14:00 | 16:00 |
| 9 | 09:00 | 11:00 | 15 | 15:00 | 17:00 |
| 10 | 10:00 | 12:00 | AM | 08:00 | 12:00 |
| 11 | 11:00 | 13:00 | PM | 13:00 | 17:00 |
| 12 | 12:00 | 14:00 | NIGHT | 17:00 | 08:00 |
| 13 | 13:00 | 15:00 | | | |

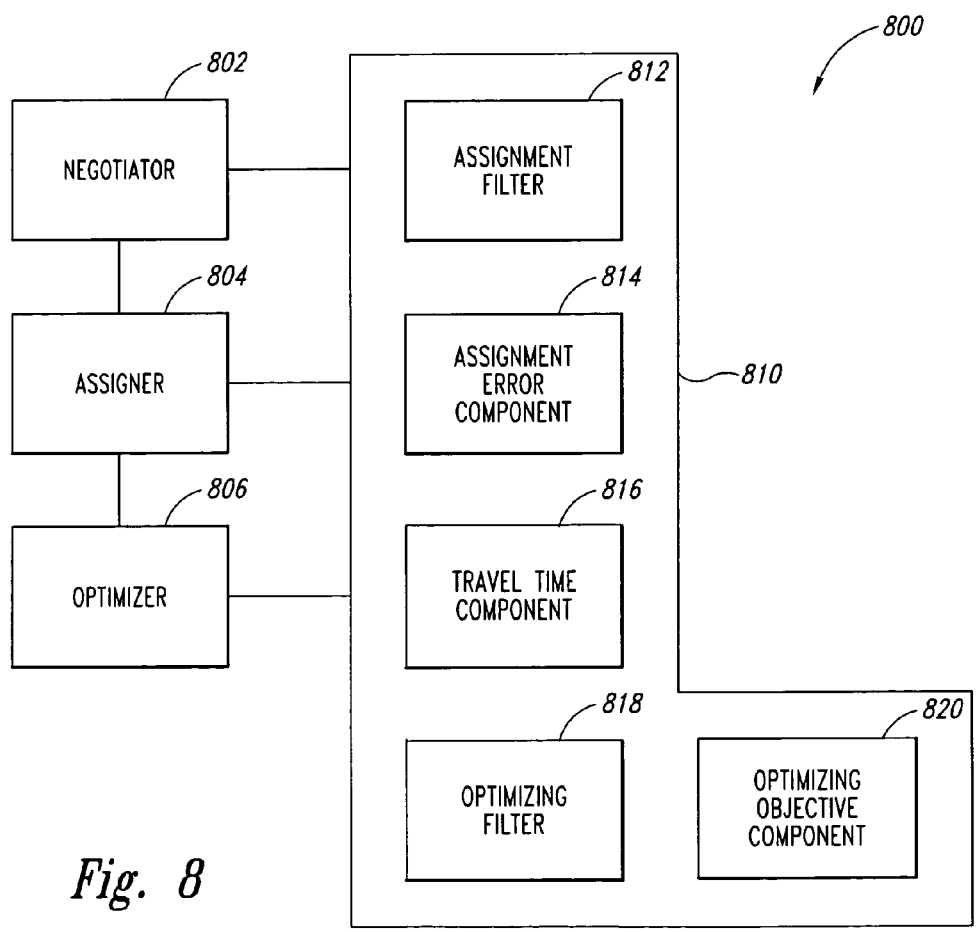

ENTERPRISE SCHEDULING SYSTEM FOR SCHEDULING MOBILE SERVICE REPRESENTATIVES

CROSS-REFERENCES TO RELATED APPLICATIONS

This application incorporates by reference and claims the benefit of U.S. Provisional Application No. 60/193,834, filed Mar. 31, 2000; U.S. Provisional Application No. 60/193,917, filed Mar. 31, 2000; U.S. Provisional Application No. 60/193,832, filed Mar. 31, 2000; U.S. Provisional Application No. 60/193,705, filed Mar. 31, 2000; and U.S. Provisional Application No. 60/193,833, filed Mar. 31, 2000; which are all incorporated herein by reference.

TECHNICAL FIELD

The invention relates generally to scheduling. More particularly, it pertains to scheduling a mobile service representative for performance of a service while periodically optimizing the schedule so as to satisfy constraints and to meet business objectives.

COPYRIGHT NOTICE-PERMISSION

A portion of the disclosure of this patent document contains materials which are subject to copyright protection. The copyright owner has no objection to the facsimile reproduction by anyone of the patent document or the patent disclosure as it appears in the Patent and Trademark Office patent files or records, but otherwise reserves all copyrights rights whatsoever. The following notice applies to the software and data as described below and in the drawings attached hereto: Copyright© 2001, MDSI Mobile Data Solutions Inc., All Rights Reserved.

BACKGROUND OF THE INVENTION

Scheduling is a process of forming a plan under which action may be taken toward a goal. For a service organization such a goal includes a number of business objectives, such as offering convenient appointments to perform services for customers, making quality commitments in regard to these appointments, and reducing costs associated with performing these services. To obtain services, a customer calls a service organization to place a work order for a service. The service organization schedules the work order. Then, the workforce of the service organization performs the service.

In practice, this process of scheduling work orders is non-trivial if the service organization desires to meet multiple business objectives, such as those mentioned above. Also, various constraints, such as break times of the workforce and the need to give priority to certain work orders, further complicates the process of scheduling.

Earlier generations of scheduling systems operate in a batch mode. These systems accept work orders from customers but are not sophisticated enough to immediately assign these work orders to a specific worker of the workforce. They offer appointment windows based on an inaccurate approximation of the capacity of the workforce. The night before the work is to be performed, these systems assign the work orders to the workforce in a large batch process. With these systems, customers are confined to a certain options relating to the service that is to be performed. This limits the ability of a service organization to satisfy the preferences of its customers.

As the expectations of customers have increased over time, scheduling systems that fail to meet these increased expectations may result in customer dissatisfaction and lead to the eventual lack of acceptance of the service organization in the marketplace. Thus, what is needed are systems and methods for enhancing the scheduling process that allows a set of constraints to be satisfied and a number of business objectives to be met while fulfilling customers' increased expectations.

SUMMARY OF THE INVENTION

An illustrative aspect of the present invention includes a scheduling system for a dispatching environment. The scheduling system includes a negotiator to negotiate an appointment window to perform an order, an assigner to assign the order to a shift of a mobile service representative, and an optimizer to optimize dynamically at least one shift so as to enhance the scheduling system in accordance with a predetermined set of business objectives.

Another illustrative aspect includes a method for scheduling. The method includes negotiating a reservation to perform an order for a customer against a schedule; booking the order having a priority, which was negotiated with the customer, against the schedule; assigning the order to a shift of the mobile service representative; and optimizing periodically the shift of the mobile service representative.

Another illustrative aspect includes a method for scheduling mobile service representatives. The method includes negotiating an appointment window for booking a reservation, assigning the reservation to a shift of a mobile service representative, and optimizing periodically the shift of the mobile service representative while the acts of negotiating and assigning are executing.

BRIEF DESCRIPTION OF THE DRAWINGS

FIGS. 3A-3C illustrate an example assignment of a reservation to a shift according to one embodiment of the present invention. FIG. 3A shows three exemplary instantiations of the three data structures discussed in FIG. 2 according to one embodiment of the present invention. FIG. 3B is a graphical diagram of a graph showing a shift according to one embodiment of the present invention. FIG. 3C is a graphical diagram of a graph showing a shift with a reservation fitted into the shift according to one embodiment of the present invention.

FIG. 3D is an example instantiation of the reservation data structure as discussed in FIG. 2. FIG. 3E is a graphical diagram of a graph showing a shift with two reservations being fitted into the shift according to one embodiment of the present invention.

FIGS. 3F-3H build on the illustration of FIGS. 3D-3E and illustrate another example assignment of yet another reservation to a shift according to one embodiment of the present invention. FIG. 3F is an example instantiation of the reservation data structure as discussed in FIG. 2. FIG. 3G is a tabular diagram of a table showing a list of appointment windows that are offered to a customer. FIG. 3H is a graphical diagram of a graph showing a shift with three reservations being fitted into the shift according to one embodiment of the present invention.

FIG. 7 is a tabular diagram showing a set of reservations to illustrate the concept of aggregation according to one embodiment of the present invention.

FIG. 8 is a block diagram showing a scheduling system according to one embodiment of the present invention.

DETAILED DESCRIPTION OF THE INVENTION

Figure 1:
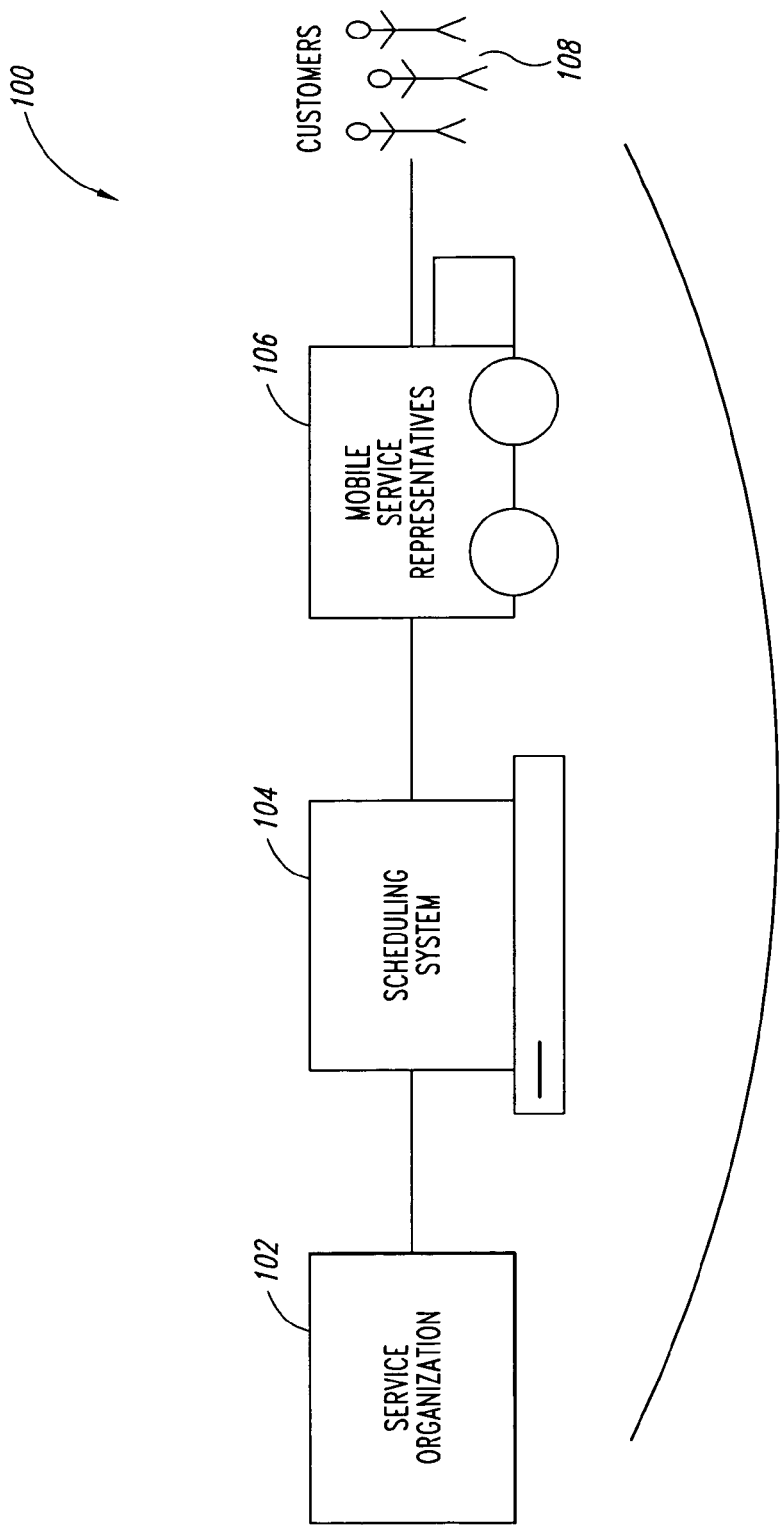
FIG. 1 is a block diagram of a system showing the relationship between a service organization, a scheduling system, mobile service representatives, and customers according to one embodiment of the present invention.

In the following detailed description of various embodiments of the invention, reference is made to the accompanying drawings, which form a part hereof, and in which are shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, electrical, and other changes may be made without departing from the spirit or scope of the present invention. The following detailed description is, therefore, not to be taken in a limiting sense, and the scope of the present invention is defined only by the appended claims. The present application incorporates by reference the following reference: Simon Jacobs, Enterprise Scheduling System (ESS) Function Specification, Rev. 4.1 (Jun. 30, 2000).

FIG. 1 is a block diagram of a system 100 according to one embodiment of the present invention. The system 100 includes a service organization 102. The service organization 102 performs services for a roster of customers. When a customer 108 is interested in having a service performed by the service organization 102, the customer 108 calls the service organization 102 to make a reservation for a service to be performed.

Using the scheduling system 104, the service organization 102 negotiates with the customer 108 to place a reservation on a schedule. The scheduling system 104 provides to the service organization 102 several appointment windows from which the customer 108 may choose. The customer 108 selects an appointment window in which the service will be performed.

During the negotiation, the scheduling system 104 determines which mobile service representatives 106 can do the work. The customer 108 picks an appointment window and the scheduling system 104 assigns to a mobile service representative 106. The mobile service representative 106 is one who is capable of performing the service requested by the customer 108. Each time a reservation is placed, the scheduling system 104 accounts for many factors in assigning the reservation to a mobile service representative 106, such as time availability, skill sets, geographic area, duration of each job, travel times between jobs, and equipment requirements. As customers 108 place more reservations for services, the scheduling system 104 periodically optimizes the schedule by relocating reservations assigned to a single mobile service representative or swapping reservations between different mobile service representatives.

The scheduling system 104 can be implemented over one machine or several machines with different processors. This allows the scheduling system 104 to be scalable depending on the needs of the service organization 102. The scheduling system 104 is also configurable. This allows the scheduling system 104 to meet different constraints and objectives. In one embodiment, the scheduling system 104 is implemented over Common Object Request Broker Architecture (CORBA). In another embodiment, the scheduling system 104 is implemented using a database, such as an Oracle database. In yet another embodiment, the scheduling system 104 uses both CORBA and an Oracle database.

Figures 4, 5A, 5B:
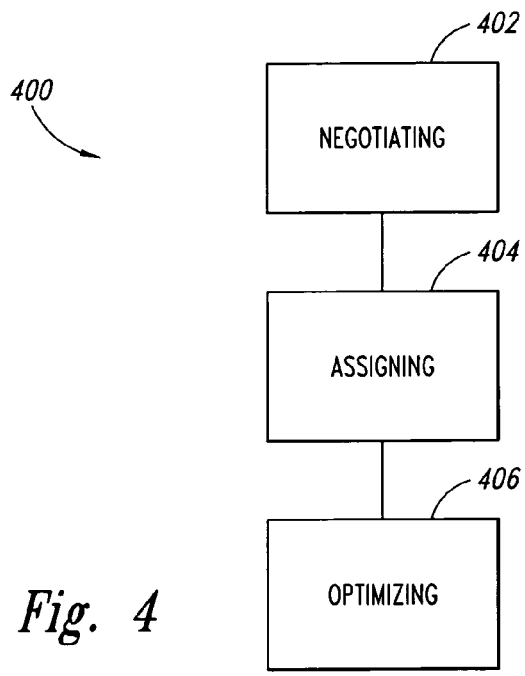
FIG. 4 is a process diagram of a method for scheduling according to one embodiment of the present invention.
FIG. 5A is a structure diagram of a data structure showing the programmatic representation of an appointment window according to one embodiment of the present invention.
FIG. 5B shows multiple instantiations of the appointment window data structure.

FIG. 4 is a process diagram of a method 400 for scheduling according to one embodiment of the present invention. The complete processing to offer appointment windows that corresponds to optimal assignments requires a considerable amount of computing time. Most customers are unwilling to wait until processing is complete so that a service organization can begin offering appointment window selections to fit a reservation. For this reason, the embodiments of the present invention separate the act of offering, which comprises the acts of negotiating and assigning, from the act of optimizing. The embodiments of the present invention provide a different suite of techniques for each act.

The method 400 includes an act 402 for negotiating. The act 402 offers appointment windows to a customer to select for a reservation. The act 402 has performed enough processing to know that the reservation may be assigned to any of the appointment windows that are offered to the customer. The method 400 includes an act 404 for assigning. The act 404 assigns the reservation to a shift of a mobile service representative provided that the shift and the mobile service representative allows the reservation to be assigned such that the appointment window is honored and certain predetermined constraints, such as sufficient skill sets to perform the work under the reservation, are satisfied The embodiments of the present invention separate the acts 402 and 404 from the act of optimizing so as to enhance the speed of processing. The benefit of this approach is that it allows the service organization to be responsive to the preferences of the customers without having to keep the customers on the phone for a long period of time. Another benefit is that a service organization can have a better understanding of its capacity to service its customers. For example, at any point in time, each reservation is known; the assignment of the reservation to a shift is known; the mobile service representative that will be working on the reservation is known; the specific time to start travel to the reservation is known; the start time of working on the reservation is known; and the time to end work is also known. This knowledge allows the service organization to tune its operation over time to service its customers better, to decrease cost, and to increase the productivity of its work force.

The method 400 also includes an act 406 for optimizing. The act 406 changes the way reservations are assigned by the act 404 to meet certain optimization objectives defined by the service organization. The act 406 may move reservations within a shift of a mobile service representative. It may swap reservations between two shifts of two mobile service representatives. It may also move reservations between two shifts of the same mobile service representative. The act 406 runs periodically. It is designed to be independent from the act 404 while new reservations are being assigned.

FIGS. 2, 3, and 5-7 discuss a number of data structures that are used by the scheduling method 400, such as reservations, mobile service representatives, shifts, appointment windows, and aggregation parameter sets. The concepts of priority and aggregation will also be introduced in connection to these data structures.

Figure 2:
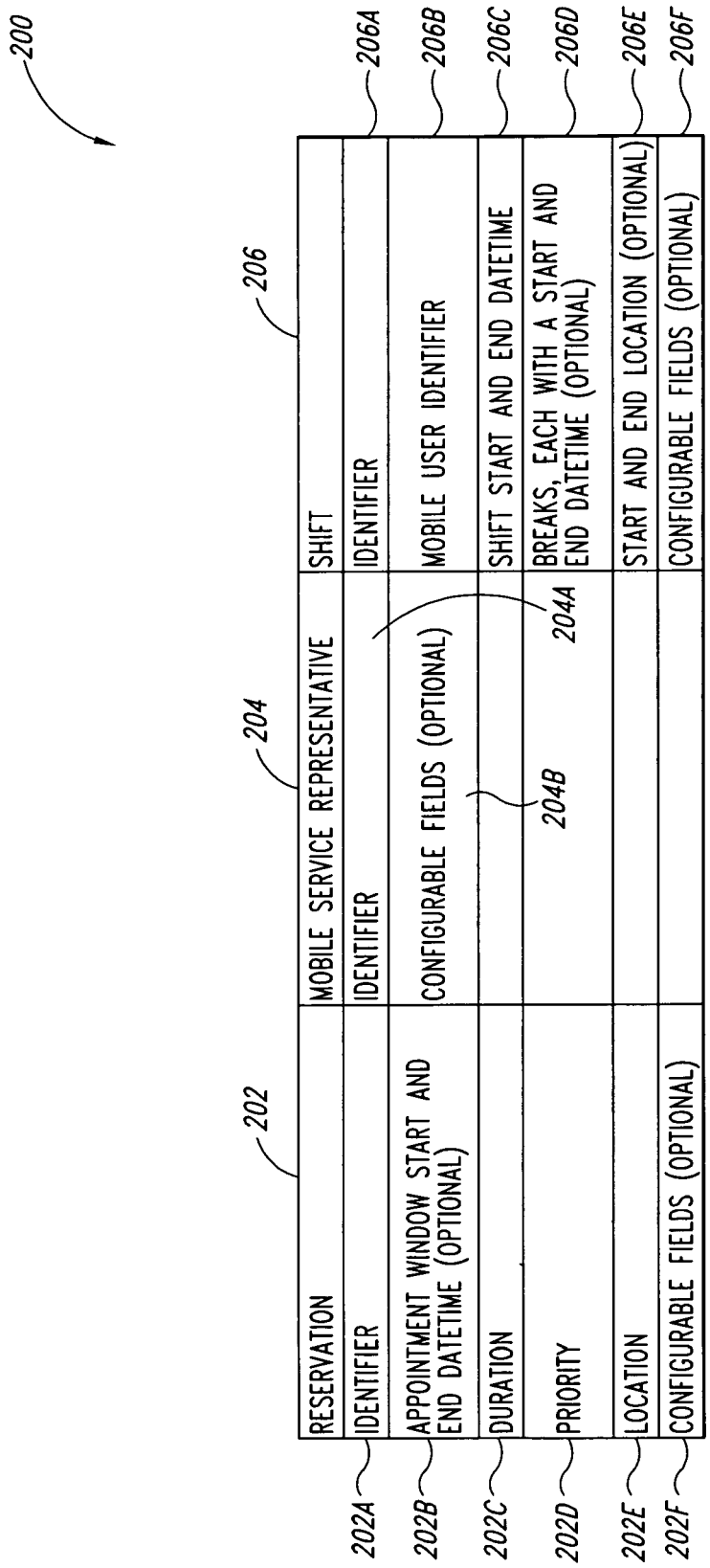
FIG. 2 is a structure diagram of three data structures showing the programmatic representation of a reservation, a mobile service representative, and a shift according to one embodiment of the present invention.

FIG. 2 is a structure diagram of a data structure 200 showing the programmatic representations of a reservation 202, a mobile service representative 204, and a shift 206 according to one embodiment of the present invention. A reservation is an order for service that needs to be performed by a mobile service representative. The mobile service representative is a worker who performs the service specified by the reservation. A shift is a time period during which the mobile service representative is available for work. These representations are used by a scheduling system to provide scheduling information to a service organization.

The reservation 202 can be assigned to a shift 206 if the reservation 202, the mobile service representative 204, and the shift 206 satisfy the constraints associated with the assignment. For example, the scheduling system will consider whether there is sufficient time left in the shift to perform the service. The scheduling system will assign a reservation to a shift if there is sufficient time in the shift for the mobile service representative to travel to the location of the reservation, perform the service requested by the reservation, and travel from the location of the reservation to a predetermined destination. In one embodiment, an additional constraint is that the performance of the service of the reservation must begin within the appointment window.

The data structure 200 represents a reservation that is placed by a customer with the scheduling system as the reservation 202. There are several data members associated with the reservation 202: an identifier 202A, which uniquely identifies each reservation 202; an appointment window 202B, which optionally specifies a time window in which the performance of the service must be commenced; a duration 202C, which specifies the time for performing the service; a priority 202D, which specifies a preferential rating for servicing the reservation; a location 202E, which specifies the geographic location where the service will be performed; and configurable fields 202F, which allow the service organization to specify additional constraints, such as the skills required to perform the work under the reservation 202.

The data structure 200 represents a mobile service representative who performs the service requested by a customer as a mobile service representative 204. There are at least two data members associated with the mobile service representative 204: an identifier 204A, which uniquely identifies each mobile service representative 204; and configurable fields 204B, which allow the service organization to specify additional constraints, such as the skills that the mobile service representative 204 possesses and the equipment that the mobile service representative 204 possesses.

The data structure 200 includes a representation of a shift as a shift 206. There are several data members associated with the shift 206: an identifier 206A, which uniquely identifies each shift 206; a mobile service representative identifier 206B, which associates the shift 206 to a unique mobile service representative 206B; a shift time frame 206C, which specifies a time period during which the mobile service representative 206B is available for work; a set of breaks, for which each break specifies a time period in which the mobile service representative 206B interrupts his work for a respite; location information 206E, which specifies the starting and ending location for the shift; and configurable fields 206F, which allow the service organization to specify additional constraints, such as the geographic areas within which the mobile service representative 206B is allowed to work during this shift.

Figure 3B:
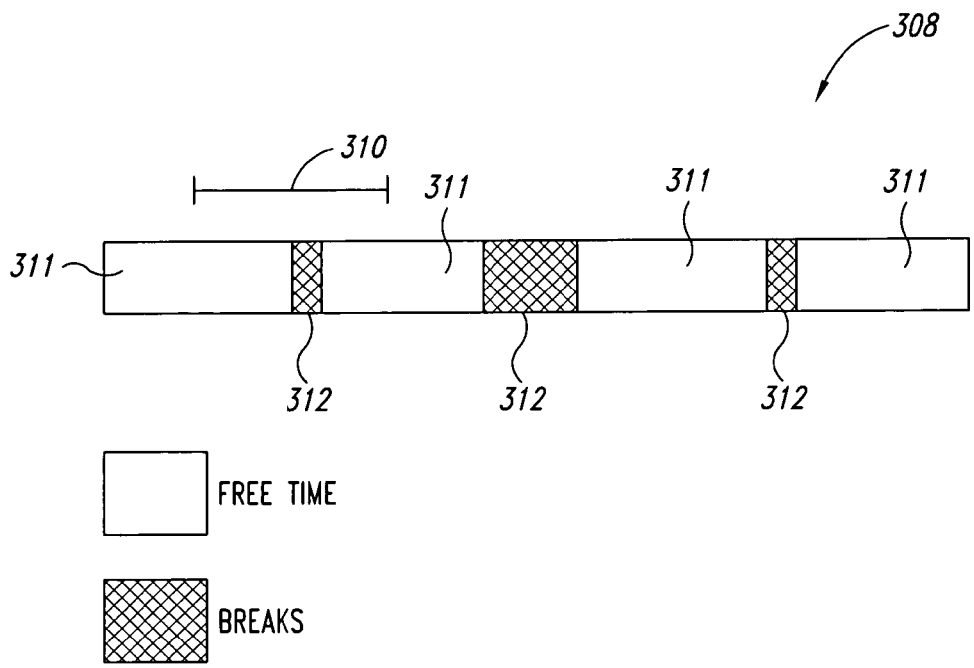
Figure 3C:
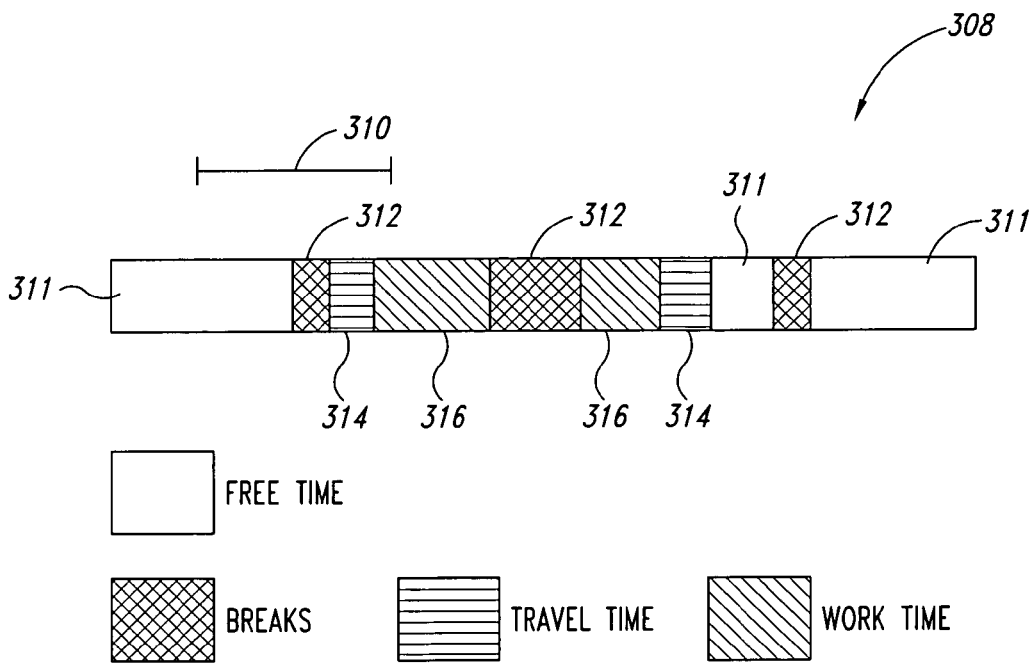

FIGS. 3A-3C illustrate an exemplary assignment of reservations to a shift according to one embodiment of the present invention. FIG. 3A shows three exemplary instantiations of the three data structures as shown in FIG. 2 according to one embodiment of the present invention. The structure 300 includes instantiations 302, 304, and 306. The instantiation 302 is created to represent a specific reservation that has been placed by a customer, such as Reservation1. The instantiation 304 is created to represent a specific mobile service representative, such as MU1. The instantiation 306 is created to represent a specific shift of the mobile service representative MU1, such as Shift1.

These instantiations are shown to ease the illustration of an example that will be discussed hereinafter. For example, if one of the requirements is that the mobile service representative be able to work in the reservation's area, have at least one of the reservation's skills, and meet all of the reservation's equipment needs, then the mobile service representative 304 is qualified to work on the reservation 302 during shift 306. More instantiations may be necessary as more reservations are placed, more mobile service representatives enter the work force of the service organization, and more shifts are imposed on the mobile service representatives.

FIG. 3B is a graphical diagram of a graph 308 showing the shift 306 discussed in FIG. 3A. The graph 308 includes an appointment window 310 of the reservation 302. In accordance with reservation 302, the appointment window 310 is between 9:00 to 11:00. The graph 308 includes several blocks of free time 311. These blocks of free time are times that a mobile service representative has available to work on a reservation. The graph 308 also includes break times, such as break times 312. These break times are specified in the shift 306.

The mobile service representative 304 can start work at any time between 9:00 and 10:00, or between 10:15 and 11:00. In one embodiment, the mobile service representative 304 is not allowed to begin work during his coffee break. In another embodiment, the scheduling system requires the mobile service representative 304 to work a minimum amount of time on the reservation 302 before taking a break.

FIG. 3C is a graphical diagram of a graph 308 showing the shift 306 discussed in FIG. 3A. The graph 308 shows that the reservation 302 has been booked into the shift 306. This booking is represented by the travel time 314 and the work time 316.

Suppose the travel times involved are thirty minutes each, and if the reservation is started at 10:45, the schedule for the mobile service representative 304 is as follows: The mobile service representative 304 begins traveling from (xs, ys), at 10:15; arrives at (x1, y1) at 10:45; works on reservation 302 for 75 minutes, until 12:00; takes lunch from 12:00 to 13:00 at the location of reservation 302; resumes work on reservation 302; completes it 45 minutes later at 13:45; starts traveling from (x1, y1) at 13:45; and arrives at (xe,ye), at 14:15.

The shift 306 of the mobile service representative 304 contains several blocks of free time 311. These blocks of free time 311 are available for the scheduling system to book additional reservations onto the shift 306. In the example discussed above, the mobile service representative 304 starts working on the reservation 302 at 10:45. But because the appointment window for the reservation 302 is anywhere from 9:00 to 11:00, the scheduling system may shuffle the starting time of the reservation so as to fit additional reservations into the shift 306.

Figures 3D, 3E:
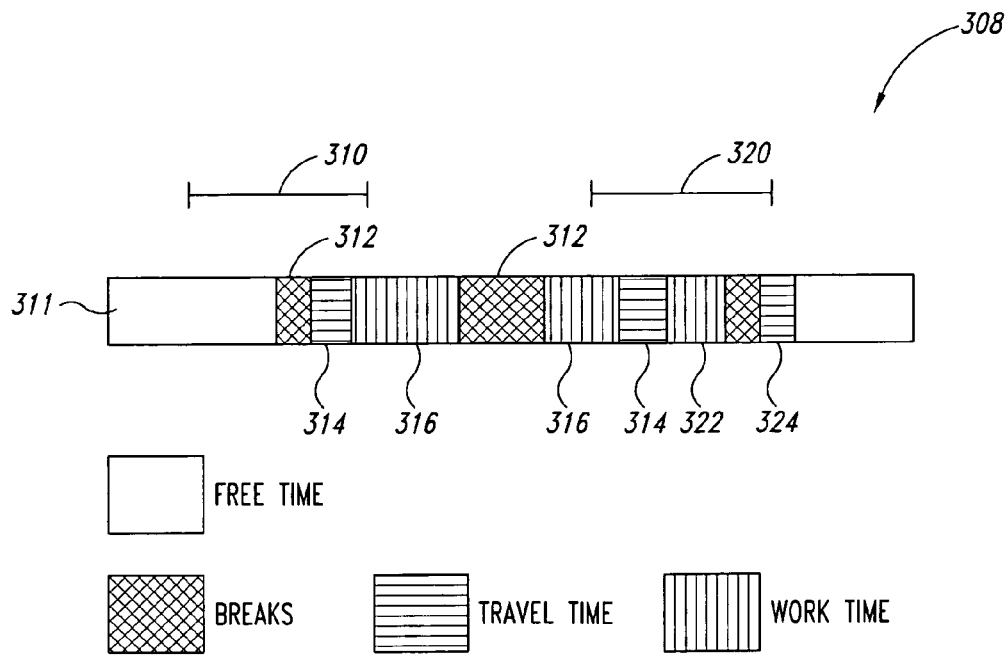
FIGS. 3D-3E build on the illustration of FIGS. 3A-3C and illustrate another example assignment of another reservation to a shift according to one embodiment of the present invention.

FIGS. 3D-3E build on the illustration of FIGS. 3A-3C and illustrate another exemplary assignment of another reservation to a shift according to one embodiment of the present invention. FIG. 3D is an example instantiation of the reservation data structure as discussed in FIG. 2. The instantiation of the reservation data structure produces reservation 318, which is uniquely identified as Reservation2.

FIG. 3E is a graphical diagram of a graph 308 showing a shift with two reservations being fitted into the shift according to one embodiment of the present invention. The graph 308 shows an appointment window 320 associated with the reservation 318. The reservation 318 has been booked into the shift 306. This booking is represented by the work time 322 and the travel time 324. There is also some travel time (not shown) associated with traveling from the last order to the end of shift location.

Suppose the mobile service representative 304 finishes work on reservation 302. He now travels from (x1, y1) to the location of reservation 318 (x2, y2); from there he travels to where his shift ends, (xe, ye). If the travel time from (x1, y1) to (x2, y2) is fifteen minutes, and the travel time from (x2, y2) to (xe, ye) is still thirty minutes, the schedule for the remainder of MU1's day is as follows: The mobile service representative 302 starts traveling from (x1, y1) at 13:45; arrives at (x2, y2) at 14:00; works on reservation 318 for 60 minutes until 15:00; takes his coffee break from 15:00 to 15:15 at the location of reservation 318; starts traveling from (x2, y2) at 15:15; and arrives at (xe, ye) at 15:45.

In one embodiment, in the process of assigning reservations to shifts, the scheduling system accounts for travel time at the start and end of a shift; accounts for travel time between reservations; recognizes the boundaries of shifts and the locations of breaks; ensures that work begins within the appointment windows specified for reservations; and ensures that the mobile users and their shifts satisfy the operational constraints of reservations.

Figure 3H:
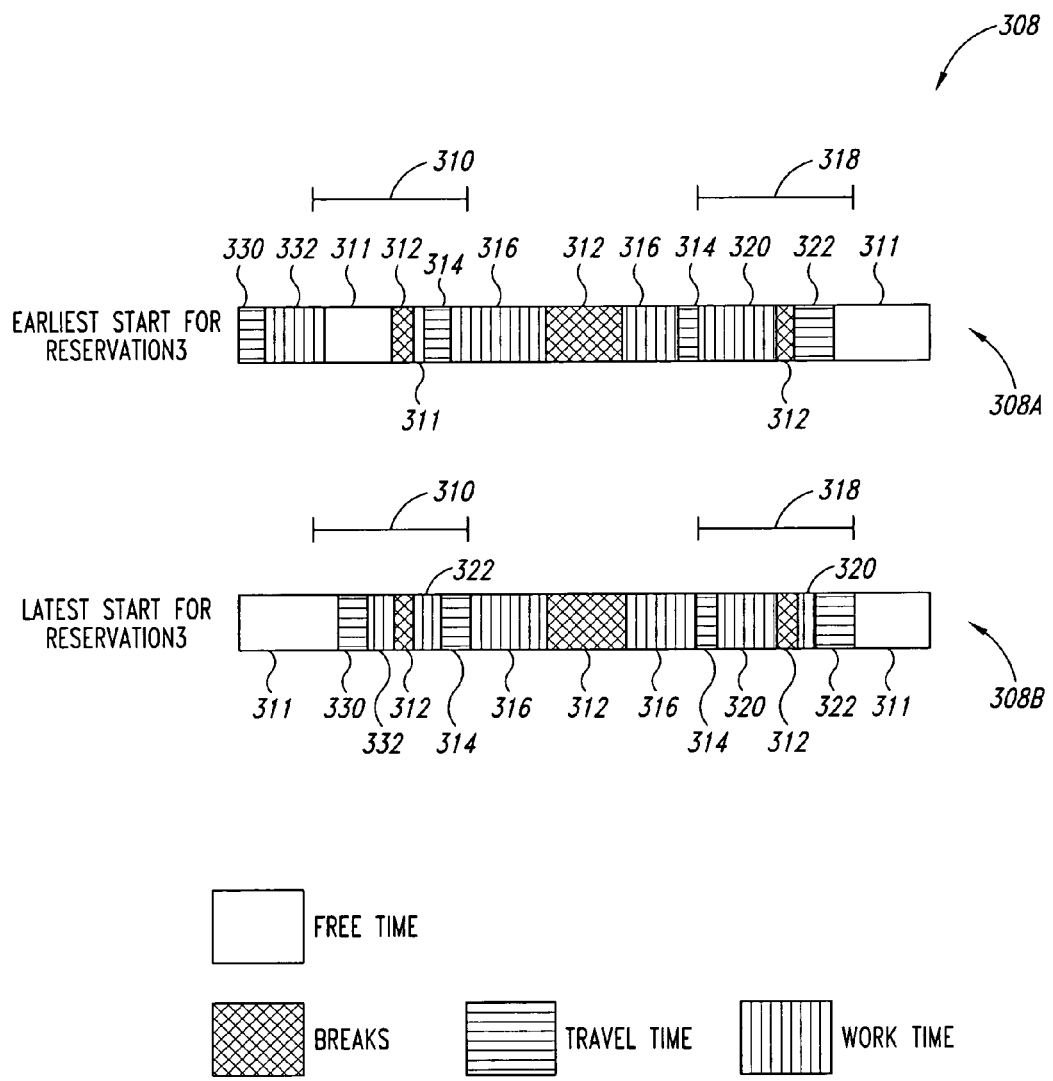

FIGS. 3F-3H build on the illustrations of FIGS. 3D-3E and illustrate another example assignment of yet another reservation to a shift according to one embodiment of the present invention. FIG. 3F shows another example instantiation of a reservation data structure as discussed in FIG. 2 according to one embodiment of the present invention. The instantiation of the reservation data structure produces reservation 326, which is uniquely identified as Reservation3.

FIG. 3G shows a table 328 illustrating a number of appointment windows available to a service organization to negotiate with a customer to book reservation 326 to the shift 306 of the mobile service representative 304. During the negotiation, a customer requests several appointment windows for a reservation and the scheduling system examines the possible ways that the reservation can fit into a mobile service representative's shifts. As discussed above, the shift 306 already contains reservation 302 and reservation 318. There are three places that reservation 326 can be fitted into the shift 306: before reservation 302, between reservation 302 and 318, and after reservation 318.

The following example illustrates how the scheduling system fits the reservation 326 before the reservation 302 in the shift 306. Suppose that the travel times are assumed to be about 20 minutes. The scheduling system can book reservation 326 into shift 306 provided that the reservation 326 starts between 8:20 and 9:35. For example, the starting time of 8:20 is determined as follows: the mobile service representative 304 starts to travel at the beginning of his shift, which is 8:00; travels for 20 minutes from (xs, ys), and arrives at (x3, y3) at 08:20; works on the reservation 326 for 50 minutes until 09:10; starts traveling from (x3, y3) at 09:10; arrives at (x3, y3) at 09:30, well in time to start work on reservation 302 at 10:45.

As another example, the starting time of 9:35 is determined as follows: The scheduling system examines the appointment window for reservation 302 and discovers that the reservation 302 allows the start of work to occur as late as 11:00, which is a shuffle of about 15 minutes. The appointment window for reservation 318 also allows a commensurate shuffle. The mobile service representative 304 starts traveling from (xs, ys) at 09:15; arrives at (x3, y3) at 09:35; works on reservation 326 for 25 minutes, until 10:00; takes his coffee break from 10:00 to 10:15 at the location of reservation 326; resumes work on reservation 326, completing it 25 minutes later at 10:40; starts traveling from (x3, y3) at 10:40; and then arrives at (x1, y1) at 11:00, in time to start reservation 302 at the end of its appointment window.

FIG. 3H is a graphical diagram of a graph showing a shift with three reservations being fitted into the shift according to one embodiment of the present invention. The reservation 326 is represented in the graphs of FIG. 3H as travel time 330 and work time 332. The graph 308A illustrates the fitting of the reservation 326 into an earliest start of the shift 306. The graph 308B illustrates the fitting of the reservation 326 into the latest start of the shift 306.

Other analyses will show that the reservation 326 can be inserted between reservation 302 and reservation 318 provided that reservation 326 is started between 11:35 and 14:05. The reservation 326 can be inserted after reservation 318 provided that reservation 326 is started between 15:35 and 15:50. The scheduled start and end times of the reservation 302 and the reservation 318 must be adjusted accordingly.

All that remains is for the possible start times to be mapped to the appointment windows as shown in table 328 of FIG. 3G. Each appointment window that overlaps one of the three start time ranges is offered to the customer by the service organization.

In the example, the flexibility in the appointment windows of the reservation 302 and the reservation 318 allows most of the appointment windows to be offered to the customer for reservation 326. In reality, there are likely to be several shifts into which reservation 326 fits, and which, in conjunction with the corresponding mobile service representatives, satisfy the operational constraints. The service organization is free to move the reservation 326 using the scheduling process to other shifts or to adjust the time at which the reservation 326 is scheduled to start in the shift 306 as long as the selected appointment window is honored. For example, if the customer selects the 09:00 to 10:00 window, the scheduling process is not allowed to schedule the start of work before 09:00, even though the start time range for the shift from which that window derives begins at 08:20.

FIG. 5A is a structure diagram of a data structure showing the programmatic representation of an appointment window according to one embodiment of the present invention. The appointment window data structure 500 includes a data member identifier 502, a data member start time 504, and a data member end time 506. The data member identifier 502 uniquely identifies an appointment window. The data member start time 504 is the start time of the appointment window. The data member end time 506 is the end time of the appointment window.

An appointment window set is a standard set of appointment windows that are offered to customers. This set is offered to customers by the service organization. In one embodiment, the scheduling system allows the service organization to make a reservation with an appointment window that is not in the set. In another embodiment, no two appointment windows can have the same start and end times. Appointment windows may overlap.

FIG. 5B shows multiple instantiations of the appointment window data structure. The appointment window set 508 shows various window options, such as a one-hour windows, two-hour windows, and morning, evening, and night window.

Figure 6A:
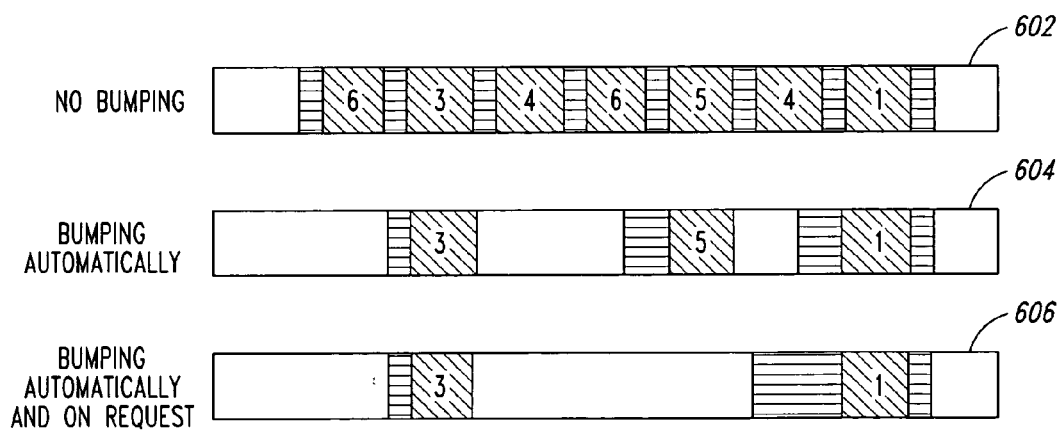
FIG. 6A is a tabular diagram showing a priority matrix according to one embodiment of the present invention.

FIG. 6A is a tabular diagram showing a priority matrix 600 according to one embodiment of the present invention. The embodiments of the present invention use priority to rank the importance of certain reservations. In one embodiment, a low priority number reflects a high priority. For example, a reservation for an emergency condition might have a priority of 1 or 2, while a reservation for preventative maintenance or inspection work might have a priority of 9 or 10.

If bumping is enabled, the embodiments of the present invention may bump (that is, remove the assignments from) lower priority reservations to make room for higher priority reservations. There are two forms of bumping: bumping automatically and bumping on request. Bumping automatically bumps reservations of specific priorities to make room for a reservation of a higher priority without prior approval from the service organization. Bumping on request bumps reservations of specific priorities to make room for a reservation of a higher priority, but only when the service organization explicitly requests such. In one embodiment, bumping is inhibited during the optimizing process.

One implementation of the bumping concept is the use of a bumping matrix. The service organization uses the bumping matrix to determine when lower priority reservations can be bumped. The priority matrix 600 in FIG. 6A defines an exemplary bumping matrix for a service organization using six priorities. The set of cells that contain "NO" or "-" indicate that a reservation of priority i cannot bump a reservation of priority j. The set of cells that contain "AU" indicate that a reservation i can automatically bump a reservation of priority j. The set of cells that contain "AP" indicate that a reservation of priority i can bump a reservation of priority j when the service organization explicitly requests such a bump.

In the priority matrix 600, a reservation of priority 1 can automatically bump reservations of priorities 4 to 6. Bumping of reservations of priorities 2 and 3 is possible when the service organization makes a request. A reservation of priority 3 can bump reservations of priority 5 automatically, but the reservation of priority 3 cannot automatically bump reservations of priority 4 and 6. The bumping characteristics for reservations of priority 2 are unusual but permissible: they allow reservations of priority 2 to bump reservations of priority 4 automatically, but to bump reservations of priority 5, the service organization must make a request.

Figure 6B:
FIG. 6B is a graphical diagram showing that higher priority reservations may bump lower priority reservations in a shift.

FIG. 6B is a graphical diagram showing that higher priority reservations may bump lower priority reservations in a shift. The graph 602 shows a shift with seven assigned reservations. The priority of each reservation is shown on the reservation.

For illustrative purposes only, the following assumptions are made for the example to be discussed: The shift does not contain breaks. Each reservation takes 45 minutes to complete. The travel time between reservations of priority 3 and 5 is 30 minutes. The travel time between reservations of priority 5 and 1 is 30 minutes. The travel time between reservations of priority 3 and 1 is 60 minutes. All other travel times are 15 minutes. Each reservation is bump enabled.

Suppose that the service organization would like to fit a reservation of priority 2 into the shift as shown in the graph 602. If the service organization does not request bumping, the scheduling system will automatically bump certain reservations using the bumping matrix 600. Thus, reservations of priority 4 and 6 will be removed from the shift as needed so as to accommodate the reservation of priority 2. The graph 604 illustrates this automatic bumping of reservations. Some of the bumpable reservations may not actually get bumped because the scheduling system bumps as few reservations as possible.

Suppose now that the service organization would like to request bumping for the reservation with priority 2. Thus, reservations of priorities 4, 5, and 6 may be removed as needed to accommodate the reservation with priority 2. The graph 606 illustrates this combination of automatic bumping and requested bumping. As discussed above, some of the bumpable reservations may not be bumped because it may not be necessary to bump all of the bumpable reservations.

FIG. 7 is a tabular diagram showing a set of reservations to illustrate the implementation of aggregation according to one embodiment of the present invention. The embodiments of the present invention allow reservations that are similar in some way to be aggregated or grouped together so that they are assigned one after the other to the shift of a mobile service representative. For example, reservations that are for the same apartment building or in close proximity might be aggregated.

There are at least two uses of aggregation. When accurate travel time information does not exist, aggregation allows reservations that are in close proximity to be identified, such as by a common street address or zip code. When accurate travel time information does exist, aggregation brings together reservations that are closely related to be assigned to the same mobile service representative, preventing more than one mobile service representative from showing up in roughly the same location at the same time. Many service organizations maintain that customer satisfaction decreases when more than one company truck is seen in the same location at the same time; aggregation reduces the likelihood that this will happen.

The embodiments of the present invention aggregate reservations by comparing values in a number of fields in each reservation. If the reservations have the same values for the corresponding fields, the reservations are aggregated. In one embodiment, other conditions must be satisfied before the reservations are aggregated even if the reservations have the same values for the corresponding fields. For example, if the fields of interest are street name and address, the embodiments of the present invention aggregates if both reservations have the same street name and address.

The embodiments of the present invention create an aggregation parameter set. The aggregation parameter set defines the fields of a reservation that will be compared for aggregation purposes. In one embodiment, if two reservations have the same values in each of the fields identified in the aggregation parameter set, then the reservations can be aggregated provided that the shift can accommodate the aggregated reservations.

The table 700 in FIG. 7 shows a set of reservations, Reservation 1 to Reservation 5. The aggregation parameter set is defined to include street name and street number. Only Reservation 2 and Reservation 4 can be aggregated using this aggregation parameter set.

FIG. 8 is a block diagram showing a scheduling system 800 according to one embodiment of the present invention. The scheduling system 800 is similar to the scheduling system 104 as discussed in FIG. 1, but is discussed here in greater detail. The scheduling system 800 includes a negotiator 802, an assigner 804, and an optimizer 806. The negotiator 802, the assigner 804, and the optimizer 806 may use a suite of components 810 to carry out their task. This suite of components 810 is configurable allowing a service organization to implements its business objectives through a set of rules and constants.

When a customer calls to place a reservation for a service to be performed, the service organization uses the negotiator 802 that in turn uses the assignment filter 812 to obtain a set of appointment windows. Then, the service organization offers this set of appointment windows to the customer. The customer selects an appointment window to fit his reservation. The negotiator 802 records the selected appointment window for the reservation.

The assigner 804 then assigns the reservation to a shift of a mobile service representative. To do that, the assigner 804 uses the assignment filter 812. The assignment filter 812 finds a set of shifts that are suitable for the reservation. For example, if a mobile service representative must have at least one of the skills associated with a reservation before he can be assigned that reservation, the assignment filter 812 provides the assigner 804 with all shifts belonging to mobile service representatives who have at least one of the skills in the reservation. In one embodiment, the assignment filter 812 also sorts the shifts it returns: more desirable shifts are sorted ahead of less desirable shifts. For example, the shifts for a mobile service representative who has two of a reservation's skills might be sorted before shifts for a mobile service representative who has only one of a reservation's skills.

After calling the assignment filter 812, the assigner 804 attempts to fit the reservation into each of the shifts that are returned, starting with the most desirable shift and working down to less desirable shifts. The assigner 804 assigns the reservation to the most desirable shift into which it fits. The assigner 804 may use the assignment error component 814 to find out the reasons why a reservation cannot be assigned to a mobile service representative or shift.

The assigner 804 may use the travel time component 816 to calculate the travel time in at least three situations: the travel time between the start location of a shift and the first reservation assigned to the shift; the travel time between two reservations assigned to a shift; and the travel time between the last reservation assigned to a shift and the end location of a shift. The travel time component 816 may use a geo-coded technique or a non-geo-coded technique.

The optimizer 806 runs periodically while the negotiator 802 negotiates with customers and the assigner 804 assigns a reservation to a shift of a mobile service representative. The optimizer 806 uses the optimizing filter 818 to find shifts into which a reservation, which has already been assigned, can be reassigned. The optimizing filter 818 filters out the shift to which the reservation is assigned. It also filters out shifts that have travel time too far away from the reservation. For example, if optimization is based solely on travel time, and the travel time associated with the reservation's current assignment is fifteen minutes, shifts that are more than fifteen minutes away from the reservation can be filtered out.

The optimization filter 818 also sorts the shifts it returns to the optimizer 806: more desirable shifts are sorted ahead of less desirable shifts. After calling the optimization filter 818, the optimizer 806 attempts to fit the reservation into each of the shifts that are returned, starting with the most desirable shift and working down to less desirable shifts. The optimizer 806 attempts to inter-shift an assigned reservation into a different shift that allows the optimization objectives as defined the optimizing objective component 820 to be better satisfied. The optimizer 806 also intra-shift assigned reservations to minimize travel time, but the optimizer 806 need not use the optimization filter 818 for intra-shifting because the reservation is staying in the same shift of the same mobile service representative.

The optimizing objective component 820 determines whether moving a reservation within a shift or swapping reservations between two shifts increases the degree to which the optimization objectives are satisfied. For example, suppose the optimizing objectives have greater preference for reducing travel time than having a suitable set of skills. In this example, a reservation can be swapped to the shift of a new mobile service representative with less suitable skills from the shift of the currently assigned mobile service representative with more desirable skills, if the amount of travel time needed for the new mobile service representative is significantly less than the currently assigned mobile service representative.

Figure 9:
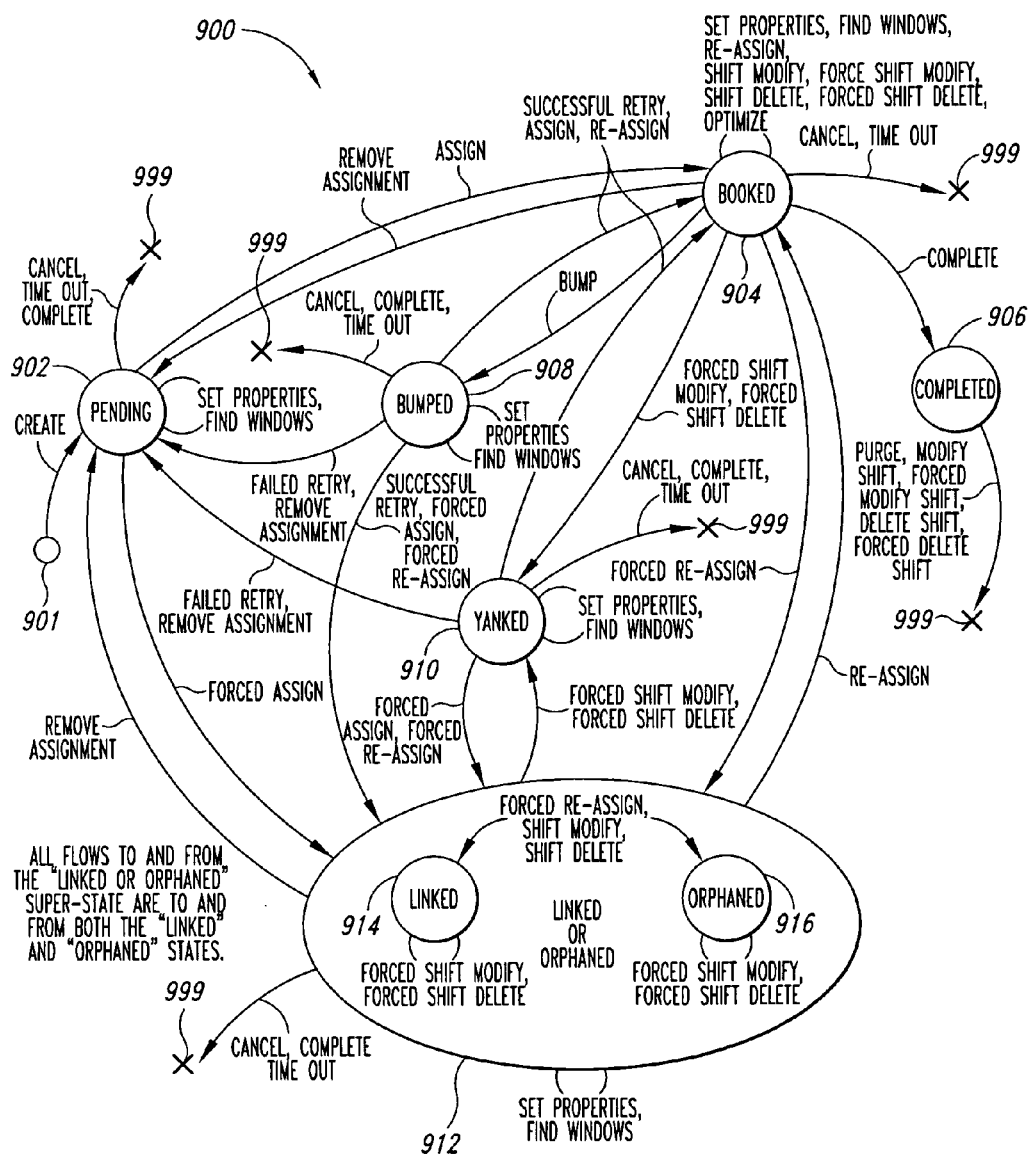
FIG. 9 is a state diagram showing the transitions of a state of a reservation in a scheduling process according to one embodiment of the present invention.

FIG. 9 is a state diagram 900 showing the transitions of a reservation according to one embodiment of the present invention. The state diagram 900 tracks the states of a reservation. In this way, the state diagram 900 offers a view into the inner workings of the scheduling process according to the embodiments of the present invention. When the scheduling process acts upon the reservation by executing various pieces of software, the reservation may transition to another state as shown in the state diagram 900. For example, a starting state 901 denotes the yet-to-be reservation. When the scheduling process creates the reservation (shown in the state diagram 900 as an arc with the word "create"), the reservation transitions from the starting state 901 to a pending state 902.

The state diagram 900 includes a starting state 901 that denotes a starting state of the reservation and several ending states 999 that denote ending states of the reservation. The starting state 901 illustrates the ingress of a reservation into the state diagram 900. In other words, it denotes the commencement of the processing of a reservation for a customer in a scheduling process. The ending state 999 illustrates the egress of the reservation from the state diagram 900. When the reservation exits from the state diagram 900, it ceases to exist as an entity useful to the scheduling process.

When a reservation is created, the state of the reservation transitions from the starting state 901 to the pending state 902. In the pending state 902, a reservation has the potential to be assigned to a shift of a mobile service representative. A reservation contains the information a scheduling process needs to make an assignment. A reservation includes one or more of the following data members: (1) an identifier; (2) a duration; (3) priority; (4) location; (5) an appointment window start date and start time; (6) an appointment window end date and end time; (6) a desired mobile user; (7) a bumping indicator; (8) an aggregation indicator; and (9) zero or more configurable fields.

While the reservation is in the pending state 902, it may transition to an ending state 999 if the reservation were to be canceled, timed out, or completed. When a reservation is canceled, it is immediately purged from the scheduling process. The reservation ceases to exist. A reservation times out when a predetermined period of time has elapsed and either no activity has transpired with respect to the reservation or the corresponding order has not been created for the reservation. When a reservation times out, it is canceled. When the scheduling process forces the reservation to be completed while in the pending state 902, the reservation is purged from the scheduling process.

While the reservation is in the pending state 902, all of its properties except for the identifier may be modified. The scheduling process may execute an act for finding appointment windows while the reservation is in the pending state

902. If the act for finding appointment windows is successful, the scheduling process will return a list of appointment windows for a service organization to negotiate with customers.

The reservation may transition from the pending state 902 to the booked state 904 if the act of assigning is executed. The scheduling process attempts to assign the reservation to a shift that is considered suitable for the reservation. If the reservation has a desired mobile service representative, the shift is associated with that mobile service representative. The reservation fits into the shift if its start of work date and time fall within the appointment window and if its start of travel date and time are later than the current date and time (that is, the time at which the request is made) by at least the value of a predetermined minimum time to start travel. For example, if the current time is 10:07 and the parameter is set to 5 minutes, the start of travel cannot be scheduled earlier than 10:12.

The shift might contain booked reservations that can be bumped by the scheduling process. When the scheduling process actually fits the reservation being assigned into the shift, it does not bump all of the reservations that it can. For example, the scheduling process might bump only two reservations even though seven reservations can be bumped if necessary. Each reservation that is bumped is placed in the bumped state 908. Reservations in a shift can be aggregated if the aggregation indicator specified in the reservation is enabled.

Sometimes the act of assigning may refuse to assign because of various factors, such as a lack of a suitable shift for the mobile service representative. In this case, the service organization may command the scheduling process to force the reservation to be assigned. When the act of forcibly assigning is executed from the pending state 902, the reservation may transition to either a linked state 914 or to an orphaned state 916.

The reservation will transition to the linked state 914 if the appointment window specified for the reservation overlaps with one or more of the shifts of the desired mobile service representative. In the linked state 914, the reservation is associated with a shift of the desired mobile service representative. The reservation will transition to the orphaned state 916 if the appointment window specified for the reservation does not overlap with any of the shifts of the desired mobile service representative. In the orphaned state 916, the reservation is associated with the desired mobile service representative but not with a shift because there is no shift that can apparently accommodate the reservation.

The booked state 904 denotes that the reservation is being assigned to a shift of a mobile service representative. The reservation may transition to an ending state 999 if the reservation is canceled or timed out. If the reservation must be changed in some way while in the booked state 904, the scheduling process may modify the reservation by setting a property from the reservation's list of properties. After the reservation is modified, the scheduling process again attempts to find a list of appointment windows and executes an act of reassigning to reassign the reservation based upon the changes in the reservation.

If the act of reassigning refuses to reassign the reservation, the service organization may force the scheduling process to reassign by executing an act of forcibly reassigning. Just as in the act of assigning, if the appointment window of the reservation overlaps with at least one of the shifts of the mobile service representative, the execution of the act of forcibly reassigning would transition the reservation from the booked state to a linked state. If there is no overlapping between the appointment window and the shifts of the mobile service representative, the reservation would transition to the orphaned state.

A shift may be changed while one or more reservations are in the booked state 904. The scheduling process may modify the structure of the shift, such as the break start date and start time and end date and end time. The scheduling process may also modify other aspects of the shift that are not structural, such as start and end locations. All fields except for the shift identifier and the mobile service representative identifier can be modified. If the changes to the shift are not structural, the scheduling process will take the modifications into account in future processing. If the changes to the shift are structural, the reservations, both in the booked state and the linked state, that are associated with the shift are removed. Then they are assigned to the modified shift.

If the act of modifying the shift refuses to execute, the service organization can force the scheduling system to forcibly modify the shift. Again, booked reservations and linked reservations are removed and assigned again to the forcibly modified shift. If there are booked reservations that cannot be booked back into the modified shift or linked reservations that cannot be booked or linked back into the modified shift, then these reservations are placed in the yanked state 910.

A shift may be deleted while in the booked state 904. The scheduling process can delete the shift if the shift has no booked or linked reservations associated with it. If the shift is deleted, it ceases to exist as an entity useful to the scheduling process. If the act of deleting refuses to delete a shift, the service organization may force the scheduling process to forcibly delete the shift. When this occurs, booked and linked reservations are removed from the shift and are placed in the yanked state 910. Then, the shift is deleted.

The scheduling process performs optimization periodically. When a reservation is in the booked state 904, it may be taken into account by the optimization processes. There are two types of optimization: intra-shift and inter-shift. Intra-shift relocates reservations assigned to a single shift to reduce the overall travel time. The properties of a shift are generally constant, such as the required set of skills, and thus intra-shift focuses on reducing travel time. Inter-shift relocates reservations assigned between two shifts to meet a set of predetermined optimization objectives.

A reservation that is in the booked state 904 may transition back to the pending state 902, if the assignment of the reservation is removed by the act of removing an assignment. When this act executes, the reservation is removed from the shift in which it is booked. The travel time between the remaining reservations in the shift is recomputed. The work time and any travel time freed up by removing the assignment are made available for future assignments to the shift.

The reservation may transition to the completed state 906 from the booked state 904 if the scheduling process executes an act of completing. The act of completing does the following to the reservation: (1) the reservation remains in the shift in which it is booked; (2) the work and travel time needed for the reservation remains unavailable for subsequent assignments to the shift; (3) the reservation cannot be bumped (even if the service organization requests bumping); (4) the reservation cannot be aggregated with other reservations that are subsequently booked to the shift (it remains aggregated with reservations that have already been booked to the shift); (5) the reservation cannot be moved to another shift (of either the same mobile service representative or a different mobile service representative); and (6) the reservation can subsequently be relocated within the shift when the scheduling process optimizes.

The completed state 906 denotes that the reservation, which has been successfully fitted into a shift of a mobile service representative, is completed (its work is done). The reservation in the completed state 906 will transition to the ending state 999 if one of the following acts were to be executed: purging, modifying a shift, force-modifying a shift, deleting a shift, and force-deleting a shift. If the reservation transitions to the ending state 999, it ceases to exist as an entity useful to the scheduling process.

The reservation transitions to the bumped state 908 from the booked state 904. It makes this transition when it is bumped from a shift because another reservation is assigned to occupy a portion of the shift that it used to occupy. The reservation transitions to the ending state 999 from the bumped state 908 if the reservation is canceled, completed, or timed out.

The scheduling process automatically attempts to assign the bumped reservation. There may be a number of bumped reservations that need to be assigned. If this is the case, the scheduling process assigns them in the order of their priority. For reservations of the same order of priority, the scheduling process assigns reservations that have been waiting longer for assignment. If the assignment is unsuccessful, the reservation will transition to the pending state 902 from the bumped state 908. If the assignment is successful, the reservation transitions to the booked state 904 once again.

If the act of assigning a bumped order refuses to assign the reservation but the reservation has specified a desired mobile service representative, the scheduling process will forcibly assign the reservation. The reservation transitions from the bumped state 908 to the linked state 914 or the orphaned state 916 if the scheduling has to forcibly assign the reservation. Recall that a transition to the linked state 914 means that the desired mobile service representative has at least one shift that overlaps with the appointment window of the reservation. Otherwise, the reservation transitions to the orphaned state 916.

While a reservation is at the bumped state 908, the properties of the reservation may be changed. If one of the reservation's properties is changed, the scheduling process finds appointment windows and attempts to reassign the reservation. If it is successfully reassigned, the reservation transitions to the booked state 904 from the bumped state 908. To clarify a point hereinabove and hereinbelow, when the discussion describes that the scheduling process takes a certain actions, it is meant that there is an external actor, such as a service organization, that acts upon the scheduling process so as to allow the scheduling process to take a desired action.

The act of reassigning a bumped order may be refused because there may not be a suitable shift for reassignment. In that case, the service organization may force the scheduling process to forcibly reassign the reservation. The reservation would transition to either the linked or the orphaned state depending on whether there is at least one shift that overlaps with the appointment window of the reservation as discussed hereinbefore.

The reservation transitions to the yanked state 910 from the booked state, the linked state, or the orphaned state when the scheduling process executes an act of forcibly modifying a shift or an act of forcibly deleting a shift. The yanked state 910 is similar to the bumped state 908 in that both the yanked state 910 and the bumped state 908 are temporary states signifying that the reservation's assignment has been removed and the scheduling system ought to automatically assign the reservation again. The reservation will transition to the ending state 999 from the yanked state 910 if the reservation is canceled, completed, or timed out.

The scheduling process automatically attempts to assign the yanked reservation. There may be a number of yanked reservations that need to be assigned. If this is the case, the scheduling process assigns them in the order of their priority. For reservations of the same order of priority, the scheduling process assigns reservations that have been waiting longer for assignment. If the assignment is unsuccessful, the reservation will transition to the pending state 902 from the yanked state 910. If the assignment is successful, the reservation transitions to the booked state 904 once again.

If the act of assigning refuses to assign the reservation but the reservation has specified a desired mobile service representative, the scheduling process will forcibly assign the reservation. The reservation transitions from the yanked state 908 to the linked state 914 or the orphaned state 916 if the scheduling has to forcibly assign the reservation.

While a reservation is at the yanked state 910, the properties of the reservation may be changed. If one of the reservation's properties is changed, the scheduling process finds appointment windows and attempts to reassign the reservation. If it is successfully reassigned, the reservation transitions to the booked state 904 from the yanked state 910.

The act of reassigning a yanked reservation may be refused because there may not be a suitable shift for reassignment. In that case, the service organization may force the scheduling process to forcibly reassign the reservation. The reservation would transition to either the linked state 914 or the orphaned state 916 from the yanked state 910 depending on whether there is at least one shift that overlaps with the appointment window of the reservation as discussed hereinbefore.

The reservation enters the linked state 914 or the orphaned state 916 from the booked state 904, the bumped state 908, or the yanked state 910 when the scheduling process forcibly reassigns the reservation. The reservation also enters the linked state 914 or the orphaned state 916 from the bumped state 908, the yanked state 910, or the pending state 902 when the scheduling process forcibly assigns the reservation. Recall again that a reservation would transition to the linked state 914 if the appointment window specified for the reservation overlaps with at least one shift of the desired mobile service representative. Otherwise, the reservation would transition to the orphaned state 916 if the appointment window specified for the reservation does not overlap with any shifts of the desired mobile service representative.

For clarity purposes, the following discussion of the linked state 914 and the orphaned state 916 is referenced as the linked/orphaned state 912. This is because the execution of pieces of software by the scheduling process in one state is similar to the other state. The reservation may transition to the ending state from the linked/orphaned state 912 if the reservation is canceled, completed, or timed out.

The reservation may transition to the pending state 902 from the linked/orphaned state 912 if the scheduling process removes the assignment of the reservation to a shift. The reservation may transition to the booked state 904 from the linked/orphaned state 912 if the following were to occur: the scheduling process changes one of the properties of the reservation, finds a new list of appointment windows, and reassigns the reservation to a new shift. The reservation may also transition to the yanked state 910 from the linked/orphaned state 912 if the scheduling process forcibly modifies a shift or forcibly deletes a shift and the reservation cannot be booked or linked back to the modified shift. The reservation remains in the linked state 914 if the reservation can be linked back to the modified shift after the scheduling process forcibly modifies a shift.

There is other administrative software provided by the scheduling process that is not shown in the state diagram 900. One piece of software adds a mobile service representative. This creates a representation of the mobile service representative so as to be used in the scheduling process. The representation includes an identifier and zero or more configurable fields. These fields include business units; default working area; skills; equipment types; mobile service representative in an emergency situation; and mobile service representative out of coverage. Two other pieces of software modify a mobile service representative and delete a mobile service representative. The piece of software for modifying a mobile service representative can modify any property associated with the mobile service representative. Current assignments of reservations to the mobile service representative are not affected. The mobile service representative can be deleted as long as there are no shifts associated with the mobile service representative. Also, the mobile service representative cannot be a desired mobile service representative of any reservation.

Another piece of software adds a shift. This creates a representation of a shift used by the scheduling process to assign reservations and optimize the assignment of reservations. The representation includes an identifier; a mobile service representative identifier; a starting date and time; an ending date and time; breaks; starting location; ending location; and loading level of the mobile service representative. The loading level reflects the maximum percentage of the time in the shift to be assigned. This is typically used for a highly skilled mobile service representative so as to free his or her time up for emergency situations that may require immediate attention.

Other pieces of software allow the service organization to query for information. One piece of software would notify the service organization if there has been an occurrence of a reservation event. An example of such a notification technique includes a suitable subscription service that allows a subscriber to be apprised of changes in an event. A reservation event would include a transition from one state to another state in the state diagram 900. Another piece of software gets the reservation assignment information for the service organization. The reservation assignment information includes the state the reservation is at in the state diagram 900. Another piece of software gets the shift assignment information. This piece of software identifies the mobile service representative associated with the shift; identifies each booked, linked, or completed reservation; and identifies the start of travel date and time, the start of work date and time, and the end of work date and time. Another piece of software gets the mobile service representative assignment information. This piece of software obtains the identifier for the mobile service representative and identifies each reservation that is associated as an orphan to the mobile service representative. Another piece of software allows the service organization to confirm a reservation. When a reservation is confirmed, the scheduling process cannot time out the reservation.

The various pieces of software discussed hereinbefore may be implemented in a CORBA environment. But such an implementation is not a limitation on the embodiments of the present invention. Other implementations that are suitable may be substituted, such as Component Object Model (COM).

What has been discussed hereinbefore is a scheduling system flexible enough to address the preferences of customers of a service organization while allowing the service organization to satisfy constraints placed on the scheduling system and to meet business objectives. The scheduling system comprises three main components. The negotiator interacts with customers to negotiate an appointment window to perform the service specified in the reservation. The assigner assigns the reservation to a shift of a mobile service representative. And the optimizer continuously optimizes the schedule in the background.

Because customers loathe waiting on the phone for an extended period of time, the embodiments of the present invention tune the negotiator and the assigner to work fast enough to obtain an agreeable time window in which a worker to perform the service requested. The assigner works immediately after the negotiator has interacted with the customers. After that, the optimizer improves the schedule in accordance to the set of optimizing objectives, such as minimizing travel time of the mobile service representative.

Although the specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. It is to be understood that the above description is intended to be illustrative, and not restrictive. Combinations of the above embodiments and other embodiments will be apparent to those of skill in the art upon reviewing the above description. The scope of the invention includes any other applications in which the above structures and fabrication methods are used. Accordingly, the scope of the invention should only be determined with reference to the appended claims, along with the full scope of equivalents to which such claims are entitled.

We claim:

1. A computer readable medium having computer-executable instructions stored thereon for causing a computer to perform a method for scheduling by performing steps comprising:

negotiating a reservation to perform an order for a customer against a schedule;

adding the reservation, wherein adding the reservation includes identifying a duration, a priority, a location, an appointment window, a mobile service representative, a bumping indicator, and an aggregation indicator for the reservation, the aggregation indicator having a first setting to enable aggregation of the reservation and having a second setting to disable aggregation of the reservation;

identifying shifts of mobile service representatives that are suitable for the reservation;

sorting the identified shifts from a more desirable shift to a less desirable shift according to objective criteria associated with the reservation;

booking the order to one of the shifts of mobile service representatives starting with the more desirable shift and in descending order to the less desirable shift according to the objective criteria;

in response to the bumping indicator indicative of enabled bumping of the reservation, bumping reservations of a shift in accordance with a bumping matrix to make room in the shift for the reservation, the bumping matrix having indicators of automatic bumping and on request bumping for the reservations enabled for bumping;

in response to the aggregation indicator having the first setting to enable aggregation of the reservation, aggregating reservations in accordance with an aggregation parameter set to group reservations together the aggregation parameter set defining information of reservations to be compared during aggregation, the aggregated reservations having a same value for the information defined by the aggregation parameter set, and in response to the aggregation indicator having the second setting to disable aggregation of the reservation, not aggregating reservations having the same value for the information defined by the aggregation parameter set; and periodically optimizing the shifts of the mobile service representative according to the order of desirability of the identified shifts, the objective criteria, the aggregation parameter set, and the bumping matrix.

2. The computer readable medium having computer-executable instructions stored thereon of claim 1, further comprising computer-executable instructions for causing a computer to perform configuring a constraint set, wherein the act of configuring allows a user to modify the constraint set so as to control the way in which orders are assigned to a mobile service representative.

3. The computer readable medium having computer-executable instructions stored thereon of claim 1, wherein negotiating includes using a window over the schedule, wherein the window defines a set of shifts in the schedule that can be booked by the act of booking.

4. The computer readable medium having computer-executable instructions stored thereon of claim 1, wherein negotiating includes negotiating an appointment window for the order so as to allow the mobile service representative to begin the performance of the order within the time frame of the appointment window.

5. The computer readable medium having computer-executable instructions stored thereon of claim 1, further comprising bumping an order, which has a lower priority, for another order, which has a higher priority.

6. The computer readable medium having computer-executable instructions stored thereon of claim 1, further comprising computer-executable instructions for causing a computer to perform escalating the priority of an order over time when the order has not been performed by the mobile service representative.

7. The computer readable medium having computer-executable instructions stored thereon claim 1, further comprising computer-executable instructions for causing a computer to perform splitting an order to a set of orders when the performance of the order requires a number of days to perform the order.

8. The computer readable medium having computer-executable instructions stored thereon of claim 1, wherein optimizing includes optimizing a single shift of a mobile service representative so as to shorten travel time between orders booked in the single shift.

9. The computer readable medium having computer-executable instructions stored thereon of claim 1, wherein optimizing includes optimizing at least one pair of shifts, wherein optimizing is selected from a group consisting of swapping orders between the at least one pair of shifts and reassigning orders between the at least one pair of shifts.

10. The computer readable medium having computer-executable instructions stored thereon of claim 1, wherein booking includes booking the order to a shift of the mobile service representative if the mobile service representative has the set of skills and the set of equipment according to the objective criteria.

11. A scheduling system for a dispatching environment having a processor and memory, the processor having a scheduling engine for scheduling mobile service representative, the scheduling engine comprising:

a negotiator operable to negotiate an appointment window to perform an order, the order defined by a data structure that includes at least one of an appointment window, a duration, a priority, a location, and a set of skills required to carry out the order, and further includes at least one of a bumping indicator and an aggregation indicator, the aggregation indicator having a first setting to enable aggregation of the reservation and having a second setting to disable aggregation of the reservation, the data structure residing on a computer media;

an assignment filter configured to identify shifts that are suitable for the reservation and further configured to sort the identified shifts from a more desirable shift to a less desirable shift according to objective criteria associated with the reservation;

an assigner operable to assign the order to a shift of a mobile service representative starting with the more desirable shift and in descending order to the less desirable shift according to the objective criteria;

a bumping component operable to bump reservations of a shift in accordance with a bumping matrix in response to the bumping indicator indicative of enabled bumping of the reservation to make room in the shift for the reservation, the bumping matrix having indicators of automatic bumping and on request bumping for the reservations enabled for bumping;

an aggregator component operable to aggregate reservations having enabled aggregation indicators in accordance with an aggregation parameter set to group reservations together, the aggregation parameter set defining information of reservations to be compared during aggregation, the aggregated reservations having a same value for the information defined by the aggregation parameter set; and an optimizer operable to optimize dynamically the shifts of the mobile service representative according to the order of desirability of the identified shifts, the objective criteria, the aggregation parameter set, and the bumping matrix.

12. The scheduling system of claim 11, wherein the order is defined by a data structure that includes an appointment window, a duration, a priority, a location, and a set of skills required to carry out the order.

13. The scheduling system of claim 11, wherein the mobile service representative is defined by a data structure that includes a set of skills that the mobile service representative possesses and the equipment that the mobile service representative possesses.

14. The scheduling system of claim 11, wherein the shift is defined by a data structure that includes a shift start date and start time, a shift end date and end time, a set of break start dates and start time, a set of break end dates and end times, and a starting location and an ending location.

15. The scheduling system of claim 11, wherein the assigner accounts for the travel time of the mobile service representative and the break time of the mobile service representative in assigning the order to the shift of the mobile service representative.

16. The scheduling system of claim 11, wherein the appointment window includes an identifier, a start time, and an end time, and wherein the appointment window is visible to the negotiator.

17. The scheduling system of claim 11, wherein the order includes a predetermined level of priority, wherein the predetermined level of priority of the order determines whether the order will be bumped by another order having a higher level of priority.

18. The scheduling system of claim 11, further comprising a travel time component that calculates the travel time between the start of a shift to the first order assigned to the shift and the travel time between two orders, and the travel time between the last order assigned to the shift and the end of the shift.

19. The scheduling system of claim 11, wherein the optimizer includes an optimizing filter, wherein the optimizing filter finds a shift into which a reservation fits, for satisfying the optimization objectives.

20. The scheduling system of claim 11, wherein the optimizer includes an optimization objective component having a set of optimization objectives, wherein the optimization objective component determines the degree to which the set of optimization objectives are satisfied by optimizing a shift or a pair of shifts.

21. A computer readable medium having computer-executable instructions stored thereon for causing a computer to perform a method for scheduling mobile service representatives by performing steps comprising:

negotiating an appointment window for booking a reservation;

adding a reservation, wherein adding a reservation includes identifying a duration, a priority, a location, an appointment window, a mobile service representative, a bumping indicator, and an aggregation indicator, the aggregation indicator having a first setting to enable aggregation of the reservation and having a second setting to disable aggregation of the reservation;

identifying shifts of mobile service representative that are suitable for the reservation;

sorting the identified shifts from a more desirable to a less desirable shift based on objective criteria associated with the reservation;

assigning the reservation to a shift of a mobile service representative starting with the more desirable shift and in descending order to the less desirable shift according to the objective criteria;

in response to the bumping indicator indicative of enabled bumping of the reservation, bumping reservations of a shift in accordance with a bumping matrix to make room in the shift for the reservation, the bumping matrix having indicators of automatic bumping and on request bumping for the reservations enabled for bumping;

in response to the aggregation indicator having the first setting to enable aggregation of the reservation, aggregating reservations in accordance with an aggregation parameter set to group reservations together, the aggregation parameter set defining information of reservations to be compared during aggregation, the aggregated reservations having a same value for the information defined by the aggregation parameter set, and in response to the second setting to disable aggregation of the reservation, not aggregating reservations having the same value for the information defined by the aggregation parameter set; and periodically optimizing the shifts of the mobile service representative according to the order of desirability of the identified shifts, the objective criteria, the aggregation parameter set, and the bumping matrix.

22. The computer readable medium having computer-executable instructions stored thereon of claim 21, further comprising computer-executable instructions for causing a computer to perform adding a mobile service representative, wherein adding the mobile service representative includes identifying a working area of the mobile service representative, a set of skills of the mobile service representative, and a set of equipment types that is possessed by the mobile service representative.

23. The computer readable medium having computer-executable instructions stored thereon of claim 21, further comprising computer-executable instructions for causing a computer to perform adding a shift, wherein adding a shift includes identifying a mobile service representative to be associated with the shift, a start time, an end time, and a set of breaks.

24. The computer readable medium having computer-executable instructions stored thereon of claim 21, further comprising computer-executable instructions for causing a computer to perform finding a list of appointment windows for the act of negotiating.

25. The computer readable medium having computer-executable instructions stored thereon of claim 21, further comprising computer-executable instructions for causing a computer to perform assigning forcibly a reservation when the act of assigning the reservation has failed.

26. The computer readable medium having computer-executable instructions stored thereon of claim 21, further comprising computer-executable instructions for causing a computer to perform removing an assignment of a reservation.

27. The computer readable medium having computer-executable instructions stored thereon of claim 21, further comprising computer-executable instructions for causing a computer to perform canceling a reservation.

28. The computer readable medium having computer-executable instructions stored thereon of claim 21, further comprising computer-executable instructions for causing a computer to inhibit bumping of the reservation during optimization.

29. The computer readable medium having computer-executable instructions stored thereon of claim 21, further comprising computer-executable instructions for causing a computer to perform reassigning a reservation.

30. The computer readable medium having computer-executable instructions stored thereon of claim 21, further comprising computer-executable instructions for causing a computer to perform reassigning forcibly a reservation.

31. The computer readable medium having computer-executable instructions stored thereon of claim 21, further comprising computer-executable instructions for causing a computer to perform reassigning a bumped or a yanked reservation.

32. The computer readable medium having computer-executable instructions stored thereon of claim 21, further comprising computer-executable instructions for causing a computer to perform setting at least one property from a set of properties of a reservation.

33. The computer readable medium having computer-executable instructions stored thereon of claim 21, further comprising computer-executable instructions for causing a computer to perform modifying the shift of a mobile service representative.

34. The computer readable medium having computer-executable instructions stored thereon of claim 21, further comprising computer-executable instructions for causing a computer to perform deleting a mobile service representative.

35. The computer readable medium having computer-executable instructions stored thereon of claim 21, further comprising computer-executable instructions for causing a computer to perform modifying a shift.

36. The computer readable medium having computer-executable instructions stored thereon of claim 21, further comprising computer-executable instructions for causing a computer to perform modifying forcibly a shift.

37. The computer readable medium having computer-executable instructions stored thereon of claim 21, further comprising computer-executable instructions for causing a computer to perform deleting a shift.

38. The computer readable medium having computer-executable instructions stored thereon of claim 21, further comprising deleting computer-executable instructions for causing a computer to perform deleting forcibly a shift.

39. The computer readable medium having computer-executable instructions stored thereon of claim 21, further comprising computer-executable instructions for causing a computer to perform notifying a subscriber when a reservation event occurs.

40. The computer readable medium having computer-executable instructions stored thereon of claim 21, further comprising computer-executable instructions for causing a computer to perform getting reservation assignment information.

41. The computer readable medium having computer-executable instructions stored thereon of claim 21, further comprising computer-executable instructions for causing a computer to perform getting shift assignment information.

42. The computer readable medium having computer-executable instructions stored thereon of claim 21, further comprising computer-executable instructions for causing a computer to perform getting mobile service representative assignment information.

43. The computer readable medium having computer-executable instructions stored thereon of claim 21, further comprising computer-executable instructions for causing a computer to perform confirming a reservation.

* * * * *